(12) United States Patent
Takahashi et al.

(10) Patent No.: US 6,828,740 B2
(45) Date of Patent: Dec. 7, 2004

(54) ELECTRODELESS DISCHARGE LAMP OPERATING APPARATUS, ELECTRODELESS COMPACT SELF-BALLASTED FLUORESCENT LAMP AND DISCHARGE LAMP OPERATING APPARATUS

(75) Inventors: Kenichiro Takahashi, Osaka (JP); Satoshi Kominami, Osaka (JP); Koji Miyazaki, Osaka (JP); Toshiaki Kurachi, Osaka (JP); Yoko Matsubayashi, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/477,305
(22) PCT Filed: Feb. 17, 2003
(86) PCT No.: PCT/JP03/01616
§ 371 (c)(1),
(2), (4) Date: Nov. 10, 2003
(87) PCT Pub. No.: WO03/071836
PCT Pub. Date: Aug. 28, 2003

(65) Prior Publication Data
US 2004/0135523 A1 Jul. 15, 2004

(30) Foreign Application Priority Data
Feb. 20, 2002 (JP) .................................... 2002-043011

(51) Int. Cl.[7] .............................................. G05F 1/00
(52) U.S. Cl. .................. 315/291; 315/307; 315/DIG. 4
(58) Field of Search ................................ 315/224, 225, 315/244, 248, 291, 307, 308, 360, DIG. 4, DIG. 5, DIG. 7

(56) References Cited

U.S. PATENT DOCUMENTS 5,994,848 A * 11/1999 Janczak ..................... 315/224
6,392,366 B1 * 5/2002 Nerone ..................... 315/291
6,486,616 B1 * 11/2002 Liu et al. .................. 315/291
6,509,698 B1 * 1/2003 Kominami et al. ......... 315/291
6,657,401 B2 * 12/2003 Kominami et al. ......... 315/291

FOREIGN PATENT DOCUMENTS

| JP | 02199796 A | 8/1990 |
|---|---|---|
| JP | 6-45087 A | 2/1994 |
| JP | 2831016 B2 | 12/1998 |
| JP | 11111486 A | 4/1999 |
| JP | 11-135290 A | 5/1999 |
| JP | 2000268992 A | 9/2000 |
| JP | 2002-15892 A | 1/2002 |

OTHER PUBLICATIONS

International Search Report of PCT/JP03/01616, mailed on Jun. 3, 2003, ISA/JPO.

* cited by examiner

Primary Examiner—Thuy Vinh Tran
(74) Attorney, Agent, or Firm—Harness, Dickey & Pierce, P.L.C.

(57) ABSTRACT

A discharge lamp operating apparatus or a compact self-ballasted fluorescent lamp includes: an AC/DC conversion unit 5 for converting an alternating voltage phase-controlled by a dimmer 2 into a direct current voltage; a DC/AC conversion unit 6 for converting an output from the AC/DC conversion unit 5 into a high frequency voltage and applying the high frequency voltage to a discharge lamp, whereby the discharge lamp is intermittently operated; and a dimming control unit 7 which generates a dimming instruction signal for driving the DC/AC conversion unit 6 so that the discharge lamp performs an intermittent operation and outputs the dimming instruction signal to the DC/AC conversion unit via a photocoupler 9, and synchronizes the timings of turn-ON and turn OFF of the phase-controlled voltage with the timings of turn-ON and turn OFF of an operation of the DC/AC conversion unit 6, respectively.

19 Claims, 12 Drawing Sheets

ELECTRODELESS DISCHARGE LAMP OPERATING APPARATUS, ELECTRODELESS COMPACT SELF-BALLASTED FLUORESCENT LAMP AND DISCHARGE LAMP OPERATING APPARATUS

TECHNICAL FIELD

The present invention is related to electrodeless discharge lamp operating apparatuses, electrodeless compact self-ballasted fluorescent lamps and discharge lamp operating apparatuses, and more particularly relates to an operating apparatus for controlling light with an incandescent lamp dimmer.

BACKGROUND ART

Fluorescent lamps have higher efficiency and a longer lifetime than incandescent lamps. Therefore, fluorescent lamps are now widely used in view of global environmental protection and also for economical reason. Moreover, in recent years, compact self-ballasted fluorescent lamps in which a fluorescent lamp and a ballast circuit are assembled as one unit have attracted attention as an energy conservation type light source for use in houses, hotels, restaurants and the like. Besides, a compact self-ballasted fluorescent lamp as it is can be used easily in place of an incandescent lamp. Therefore, use of compact self-ballasted fluorescent lamps is apparently going to spread more and more.

Furthermore, electrodeless compact self-ballasted fluorescent lamps which do not include an electrode recently draw attention as an economical light source because their lifetime is several times longer than that of known compact self-ballasted fluorescent lamps which include an electrode. Thus, the demand for electrodeless compact self-ballasted fluorescent lamps shows a tendency of an increase.

Meanwhile, in houses and hotels, people read books, enjoy family time, and perform various other living activities. For a comfortable lighted environment suitable to such living activities, it is required to provide light of appropriate brightness for each scene. In the case of an incandescent lamp, the brightness of light can be controlled in a simple manner by using a commercially-available incandescent lamp incandescent lamp dimmer. As for dimming of an incandescent lamp, it is general to use a technique in which the brightness of light is controlled by turning ON/OFF a commercial power voltage to alter an ON period of an incandescent lamp, i.e., a technique in which a phase-controlled voltage is input to an incandescent lamp using an incandescent lamp dimmer. On the other hand, in the case of a compact self-ballasted fluorescent lamp, it is also required to change the brightness of light using an existing incandescent lamp dimmer in the same manner as in the case of an incandescent lamp. However, since light of a fluorescent lamp is generated by discharge, unlike an incandescent lamp, it is difficult to achieve a practically usable, dimmable fluorescent lamp by simply controlling power supply.

Recently, to meet needs from users for controlling the brightness of light with an existing incandescent lamp dimmer in the same manner as in the case of an incandescent lamp, an electrode-including compact self-ballasted fluorescent lamp which can be connected to an incandescent lamp dimmer to perform dimming was developed (Japanese Unexamined Patent Publication No. 11-111486). However, under the present circumstances, a dimmable electrodeless compact self-ballasted fluorescent lamp has still not been developed.

Moreover, when dimming of the dimmable electrode-including compact self-ballasted fluorescent lamp is performed, the electrode-including compact self-ballasted fluorescent lamp is connected to a commercially available incandescent lamp dimmer and used in many cases. In such cases, dimming of the electrode-including compact self-ballasted fluorescent lamp can be in principle performed with any incandescent lamp dimmer as a commercially available incandescent lamp dimmer. However, depending on incandescent lamp dimmers, a dimming operation of a lamp can not be normally performed and inconveniences such as flickering or difficulties in operating the lamp might be caused. This is what the present inventors found through actual experiments.

To solve the above-described problems, the present invention has been devised. Therefore, it is an object of the present invention to provide an electrodeless discharge lamp operating apparatus, an electrodeless compact self-ballasted fluorescent lamp operating apparatus and a discharge lamp operating apparatus in which flickering and a difficulty in operating are prevented and stable dimming operation is achieved.

Moreover, it is another object of the present invention to supply electrical energy during an entire conduction period of a phase-controlled voltage to operate a discharge lamp so that a dimming range is increased to a larger size than that of a known lamp operating apparatus.

DISCLOSURE OF INVENTION

An electrodeless discharge lamp operating apparatus in accordance with the present invention includes: an electrodeless discharge lamp; an AC/DC conversion unit for converting an alternating current voltage phase-controlled by a dimmer into a direct current voltage; a DC/AC conversion unit for converting the direct current voltage into a high frequency voltage and driving, with the high frequency voltage, the electrodeless discharge lamp so that the electrodeless discharge lamp performs an intermittent operation including an operation period in which the electrodeless discharge lamp is operated and a non-operation period in which the electrodeless discharge lamp is turned OFF; and a dimming control unit for outputting to the DC/AC conversion unit a dimming instruction signal for changing the ratio between the operation period and the non-operation period, and the dimming control unit detects turn-ON and turn-OFF of the phase-controlled alternating voltage and substantially synchronizes the timings of the turn-ON and the turn-OFF with the start timings of the operation period and non-operation period of the intermittent operation by the DC/AC conversion unit, respectively.

In one preferred embodiment of the present invention, the DC/AC conversion unit drives the electrodeless discharge lamp so that the electrodeless discharge lamp performs an intermittent operation including an operation period in which the high frequency voltage is applied to the electrodeless discharge lamp to operate the electrodeless discharge lamp and a non-operation period in which the generation of the high frequency voltage is stopped to turn OFF the electrodeless discharge lamp.

Moreover, in another preferred embodiment of the present invention, the DC/AC conversion unit drives the electrode discharge lamp so that the electrode discharge lamp performs an intermittent operation including an operation period in which the direct current voltage is converted into a high frequency voltage with which the electrodeless discharge lamp is operated and then applied to the electrodeless discharge lamp and a non-operation period in which the direct current voltage is converted into a high frequency voltage with which the electrodeless discharge lamp is not operated and then applied to the electrodeless discharge lamp.

Furthermore, in still another preferred embodiment of the present invention, the DC/AC conversion unit includes at least one switching element and drives by changing a voltage between gate and source of the switching element, when the direct current voltage is converted into a high frequency voltage and then applied to the electrodeless discharge lamp, the electrodeless discharge lamp so that the electrodeless discharge lamp performs an intermittent operation including an operation period in which the electrodeless discharge lamp is operated and a non-operation period in which a less amount of current is passed in the electrodeless discharge lamp than that in the operation period to turn OFF the electrodeless discharge lamp.

Moreover, it is preferable that the dimming control unit includes a photocoupler as means for transmitting the dimming instruction signal to the DC/AC conversion unit.

An electrodeless compact self-ballasted fluorescent lamp includes: an electrodeless fluorescent lamp; a ballast circuit for applying a high frequency voltage to the electrodeless fluorescent lamp; and a base electrically connected to the ballast circuit, the electrodeless fluorescent lamp, the ballast circuit and the base are assembled as one unit, the ballast circuit includes: an AC/DC conversion unit for converting an alternating current voltage phase-controlled by a dimmer into a direct current voltage and outputting the converted voltage; a DC/AC conversion unit for converting the direct current voltage into a high frequency voltage and driving, with the high frequency voltage, the electrodeless discharge lamp so that the electrodeless discharge lamp performs an intermittent operation including an operation period in which the electrodeless discharge lamp is operated and a non-operation period in which the electrodeless discharge lamp is turned OFF; and a dimming control unit for outputting to the DC/AC conversion unit a dimming instruction signal for changing the ratio between the operation period and the non-operation period, and the dimming control unit detects turn-ON and turn-OFF of the phase-controlled alternating voltage and substantially synchronizes the timings of the turn-ON and the turn-OFF with the start timings of the operation period and non-operation period of the intermittent operation of the DC/AC conversion unit, respectively.

It is preferable that the dimming control unit includes a dimming signal input unit for inputting the alternating current voltage phase-controlled by the dimmer, a photocoupler connected to the dimming signal input unit, and a dimming instruction signal unit for transmitting the dimming instruction signal from the photocoupler to the DC/AC conversion unit.

A first discharge lamp operating apparatus in accordance with the present invention includes: a discharge lamp; an AC/DC conversion unit for converting an alternating current voltage phase-controlled by a dimmer into a direct current voltage and outputting the converted voltage; a DC/AC conversion unit for converting the direct current voltage into a high frequency voltage and driving the discharge lamp so that the discharge lamp performs an intermittent operation including an operation period in which the high frequency voltage is applied to operate the discharge lamp and a non-operation period in which the generation of the high frequency voltage is stopped to turn OFF the discharge lamp; and a dimming control unit for outputting to the DC/AC conversion unit a dimming instruction signal for changing the ratio between the operation period and the non-operation period, and the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit constant.

A second discharge lamp operating apparatus in accordance with the present invention includes: a discharge lamp; an AC/DC conversion unit for converting an alternating current voltage phase-controlled by a dimmer into a direct current voltage and outputting the converted voltage; a DC/AC conversion unit for driving the discharge lamp so that the discharge lamp performs an intermittent operation including an operation period in which the direct current voltage is converted into a high frequency voltage with which the electrodeless discharge lamp is operated and then applied to the discharge lamp and a non-operation period in which the direct current voltage is converted into a high frequency voltage with which the discharge lamp is not operated and then applied to the discharge lamp; a dimming control unit for outputting to the DC/AC conversion unit a dimming instruction signal for changing the ratio between the operation period and the non-operation period, and the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit constant.

A third discharge lamp operating apparatus in accordance with the present invention includes: a discharge lamp; an AC/DC conversion unit for converting an alternating current voltage phase-controlled by a dimmer into a direct current voltage and outputting the converted voltage; a DC/AC conversion unit which includes at least one switching element and drives by changing a voltage between gate and source of the switching element, when the direct current voltage is converted into a high frequency voltage and then applied to the discharge lamp, the discharge lamp so that the discharge lamp performs an intermittent operation including an operation period in which the discharge lamp is operated and a non-operation period in which a less amount of current is passed in the discharge lamp than that in the operation period to turn OFF the discharge lamp; a dimming control unit for outputting to the DC/AC conversion unit a dimming instruction signal for changing the ratio between the operation period and the non-operation period, the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit constant.

In one preferred embodiment of the present invention, the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit substantially 0.

Moreover, in another preferred embodiment of the present invention, the dimming control unit includes a photocoupler as means for transmitting the dimming instruction signal to the DC/AC conversion unit.

Furthermore, in still another preferred embodiment of the present invention, characterized in that the discharge lamp is an electrode-including fluorescent lamp.

BEST MODE FOR CARRYING OUT THE INVENTION

Before detail description on embodiments of the present invention is made, items examined in advance of the present invention will be described.

Figure 8:
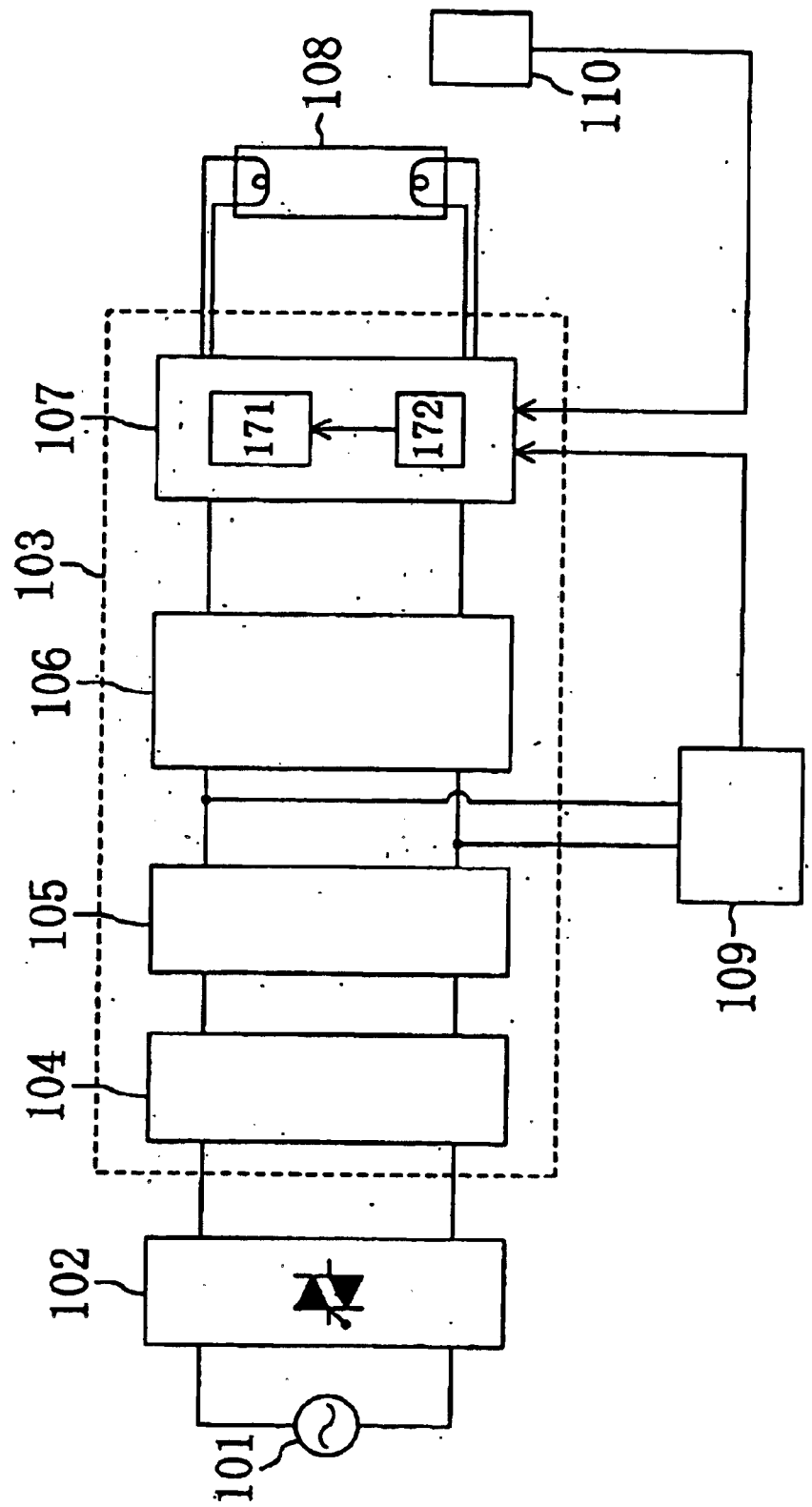
FIG. 8 is a circuit diagram illustrating the configuration of an electrode-including discharge lamp operating apparatus in a known example.

First, an electrode-including discharge lamp operating apparatus disclosed in Japanese Unexamined Patent Publication No. 11-111486 and shown in FIG. 8 was examined. The discharge lamp operating apparatus uses a frequency conversion technique with which dimming is performed by changing the operation frequency of an inverter circuit. In the technique, the brightness of a fluorescent lamp is changed according to the conduction angle, i.e., the conduction period (on-period), of a phase-controlled voltage to be input.

The discharge lamp operating apparatus shown in FIG. 8 includes a phase control apparatus 102 connected to a commercial power line 101, a high frequency generator 103 and a fluorescent lamp 108. The discharge lamp operating apparatus further includes a sensor means 109 for detecting the conduction angle of a phase-controlled voltage, and a light detection unit 110 for detecting light output of a fluorescent lamp. Moreover, the high frequency generator 103 includes a harmonic suppression filter 104, a rectifier 105, a smooth direct-current voltage conversion unit 106 for converting a phase-controlled voltage into a smooth direct current voltage and an inverter unit 107 for converting a direct-current converted voltage into high-frequency waves. The inverter unit 107 includes a switching unit 171 and an oscillation control unit 172 for sending a signal for controlling the switching unit 107. Moreover, the sensor means 109 alters the output frequency of the oscillation control unit of the inverter unit 107 according to the detected conduction angle. By the altering of output frequency, light output from a discharge lamp is varied. Meanwhile, the light detection unit 110 alters the output frequency of the oscillation control unit 172 according to the amount of detected light.

In the frequency change dimming technique, the switching frequency (operation frequency) of an inverter need to be widely changed and a driving circuit for driving a switching element need to be able to respond to in a wide frequency range. Furthermore, because the switching frequency of an inverter is altered in a wide range, complicated noise prevention measures are required, thus resulting in increase in costs (Japanese Patent Publication No. 2831016).

As another dimming technique, there is a phase control technique in which an output obtained by phase-controlling by a triac an alternating current power from a power source and then full-wave rectifying the phase-controlled alternating current power is supplied to an inverter circuit, and then the high-frequency output is supplied to a discharge lamp, so that a lamp current is limited to perform dimming. However, in this phase control technique, as dimming depth is increased by making the conduction angle of a triac closer to π, a phenomenon of a operation failure, flickering or the like occurs. If such a phase control technique is used for a discharge lamp operating apparatus to be connected to an electrical input which has passed through an incandescent lamp dimmer, operation failure and flickering are caused more frequently.

As one of dimming techniques for solving the problem of an operation failure or flickering phenomenon which occurs when a dim level is increased in the phase control technique, there is an intermittent operation technique in which with the switching frequency of an inverter circuit kept constant, dimming is performed by changing the ratio of the on-period and off-period of a switching element and intermittently applying a high-frequency voltage to a discharge lamp. Such a technique is disclosed, for example, in Japanese Unexamined Patent Publication No. 2-199796 and Japanese Unexamined Patent Publication No. 2000-268992.

However, even if the intermittent operation technique is used, depending on incandescent lamp dimmers, inconveniences such as flickering and operation failure of a lamp might be caused. The present inventors supposed that a possible cause for such inconveniences mainly lies in that a dimming instruction signal is not synchronized with turn-ON and turn-OFF of a voltage phase-controlled by a triac, and thus necessary energy for operating a discharge lamp is not supplied. Herein, "being synchronized" means to be in the state where a dimming instruction signal is generated so as to temporally correspond to the turn-ON and the turn-OFF or a dimming instruction signal is always generated with a certain time difference from the turn-ON and the turn-OFF. Then, the present inventors made the following assumption. As for an electrodeless fluorescent lamp, specifically, in the case where a switching element of an inverter circuit is turned ON/OFF to intermittently drive electrical energy supplied to the electrodeless fluorescent lamp, a large amount of electrical energy supply is required momentarily in starting an operation of the electrodeless fluorescent lamp by turning the switching element ON. Thus, if a dimming instruction signal is not synchronized with turn-ON/OFF of the phase-controlled voltage, the voltage level varies every time when an operation of the lamp is started, resulting in flickering of the lamp. Then, the present inventors reached a conclusion to devise a technique in which in the electrodeless fluorescent lamp, the timing of turn-ON of the voltage phase-controlled by the triac is accurately detected by a sensor means and then the switching element of an inverter circuit is turned ON by a dimming instruction signal generated based on an obtained detection result so as to be synchronized with the timing of turn-ON of the phase-controlled voltage.

Based on the examination described above, the present inventors formed a dimming control unit for substantially synchronizing the timing of turn-ON/OFF of a dimming instruction signal with the timing of turn-ON/OFF of the phase-controlled voltage, thereby achieving a discharge lamp operating apparatus which does not cause flickering and can perform stable dimming.

Hereinafter, embodiments of the present invention will be described with reference to the accompanying drawings. In the following drawings, each component having substantially the same function is identified by the same reference numeral for the purpose of simplification. Note that the present invention is not limited to the following embodiments.

EMBODIMENT 1

Figure 1:
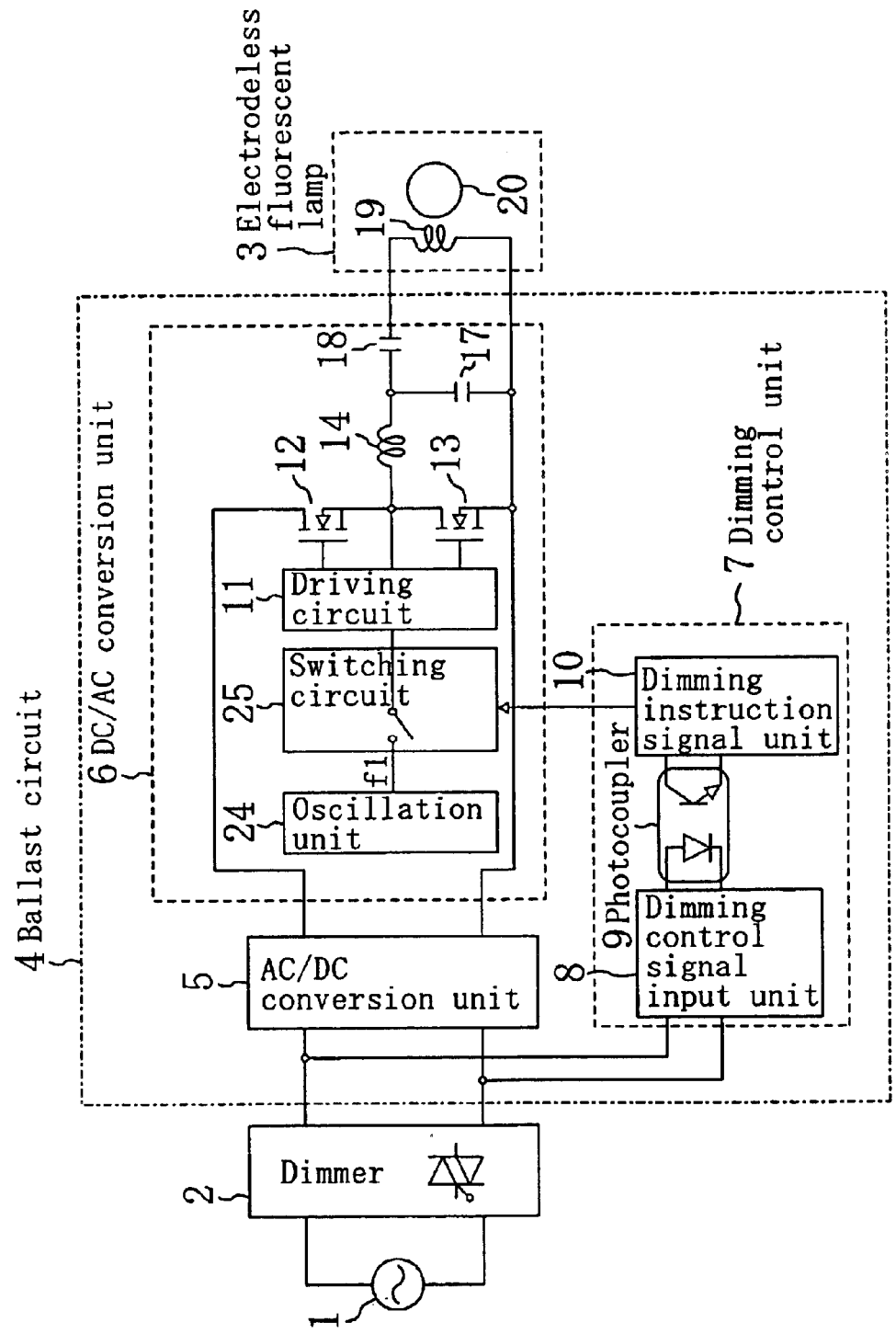
FIG. 1 is a circuit diagram illustrating the configuration of a discharge lamp operating apparatus in accordance with EMBODIMENT 1 of the present invention.

FIG. 1 schematically illustrates the configuration of a discharge lamp operating apparatus in accordance with EMBODIMENT 1 of the present invention.

The discharge lamp operating apparatus of EMBODIMENT 1 includes a electrodeless fluorescent lamp 3, a dimmer 2 for phase-controlling the voltage of a commercial power line 1, and a ballast circuit 4 for controlling an operation of the electrodeless fluorescent lamp 3 according to turn-ON and turn-OFF of the voltage phase-controlled by the dimmer 2. The commercial power line 1 is an alternating current power source of, e.g., 60 Hz and 100 V and connected to the dimmer 2. The dimmer 2 is a dimmer using a well-known phase-control technique with a triac. A commercially available incandescent lamp dimmer can be used as the dimmer 2.

The ballast circuit 4 includes an AC/DC conversion unit 5, a DC/AC conversion unit 6 and a dimming control unit 7. Note that the concepts of the terms of AC/DC conversion unit 5, DC/AC conversion unit 6 and dimming control unit 7 correspond to those of the terms of smooth direct current voltage conversion unit, inverter unit and sensor unit used in Japanese Unexamined Patent Publication No. 11-111486, respectively.

The AC/DC conversion unit 5 converts a phase-controlled voltage supplied from the dimmer 2 into a direct current. As the AC/DC conversion unit, a well-known AC/DC converter may be used. For example, a converter using a diode bridge, a smoothing capacitor and the like can be used.

Moreover, the DC/AC conversion unit 6 includes an oscillation unit 24, a switching circuit 25, a driving circuit 11, MOSFETs 12, 13, a resonance inductor 14, and resonance capacitors 17, 18. An induction coil 19 is connected to the resonance capacitor 18 in series, and furthermore a serial circuit of the induction coil 19 and the resonance capacitor 18 is connected to the resonance capacitor 17 in parallel. The induction coil 19 and an electrodeless discharge valve 20 together form the electrodeless fluorescent lamp 3.

Moreover, the dimming control unit 7 includes a dimming control signal input unit 8 for inputting a voltage phase-controlled by the dimmer 2, a photocoupler 9, and a dimming instruction signal unit 10 for transmitting a dimming instruction signal to the DC/AC conversion unit 6.

The reason why the photocoupler 9 is used in the present invention is to reliably transmit, according to a change in the voltage phase-controlled by the dimmer, a dimming instruction signal with a good timing to the driving circuit 11 for driving the switching elements 12, 13 via the switching circuit 25 without being influenced by a power circuit, i.e., the DC/AC conversion circuit. Note that as the photocoupler 9 used for this reason, a fast response photocoupler whose rise time and fall time are short is used, as a matter of course.

Hereinafter, an operation of the discharge lamp operating apparatus of EMBODIMENT 1 will be described.

An output voltage of the commercial power line 1 is phase-controlled by the dimmer 2. The alternating current voltage phase-controlled by the dimmer 2 is converted into a direct current voltage by the AC/DC conversion unit 5.

The driving circuit 11 for driving the MOSFETs 12 and 13 of the DC/AC conversion unit 6 is driven by output of a driving frequency f1 (Hz) of the oscillation unit 24 to turn ON the MOSFETS 12 and 13 alternately, and thereby the direct current voltage smoothed by the AC/DC conversion unit 5 is converted into a high frequency voltage. The high frequency voltage is applied to the resonance circuit including the resonance inductor 14, the resonance capacitors 17 and 18 and the induction coil 19. Herein, the electrodeless fluorescent lamp 3 is formed of the induction coil 19 and the electrodeless discharge valve 20, so that the ballast circuit 4 can apply a high frequency voltage to the electrodeless fluorescent lamp 3. By energy supplied by an alternating electromagnetic field generated due to an electric current flowing through the induction coil 19 in the electrodeless discharge valve 20, a light emitting gas (not shown) enclosed in the electrodeless discharge valve 20 is excited to emit light. As the light emitting gas, for example, mercury, krypton, xenon, or the like, or a mixture including at least one of these gases is used.

Note that in this case, the timings of turn-ON and turn-OFF of the voltage phase-controlled by the dimmer 2 are detected by the dimming control unit 7, a dimming instruction signal generated by the dimming control unit 7 is continuously transmitted to the switching circuit 25 during a period between the turn-ON and the turn-OFF (i.e., a conduction period of the phase-controlled voltage). During a period in which a dimming control signal is being transmitted to the switching circuit 25 (i.e., an ON-period or an operation period of the electrodeless fluorescent lamp), the switching circuit is ON, so that the driving circuit 11 of the MOSFETs 12 and 13 are turned ON. In contrast, during a period in which a dimming control signal is not being transmitted to the switching circuit 25 (i.e., an OFF-period or a non-operation period of the electrodeless fluorescent lamp), the switching circuit 25 is OFF, so that the driving circuit 11 of the MOSFETs 12 and 13 are turned OFF. During a period in which the switching circuit is ON, the MOSFETs 12 and 13 are repeatedly turned ON and OFF alternately at the driving frequency f1 (Hz). According to a change in the conduction period of the voltage phase-controlled by the dimmer 2, the ratio between the ON- and OFF-periods of the switching circuit determined by a dimmer control signal from the dimming control unit 7 is varied. Accordingly, the ratios between the ON- and OFF-periods (referred to as the "duty ratio") of the MOSFETs 12 and 13 are varied. By changing the duty ratio, an electrical energy input to the electrodeless fluorescent lamp 3 is varied, so that dimming of the electrodeless fluorescent lamp 3 is performed.

An operation of the dimming control unit 7 will be now described in detail.

Hereinafter, an operation of the dimming control unit 7 will be described with reference to FIGS. 1 and 2. In each of FIGS. 2a through 2d showing four waveforms, the abscissa indicates the time axis and the same scale is used.

FIG. 2a shows the waveform of the voltage phase-controlled by dimmer 2. The phase-controlled voltage is first input to a dimming control signal input unit 8 of the dimming control unit 7, full-wave rectified by the dimming control signal input unit 8, reduced to an appropriated level (e.g., 2 V) for driving the photocoupler 9, and then applied to the photocoupler 9. At the same time the phase-controlled voltage by the dimmer 2 is turned ON, the full-wave rectified voltage to be input to the photocaoupler 9 is turned ON. Furthermore, after a rise time of the photocoupler 9 (e.g., 20 μs), a built-in light emitting diode provided in the photocoupler 9 emits light. Due to light-emission of the light emitting diode, a dimming instruction signal is transmitted from a transistor constituting the photocoupler 9 to the switching circuit 25 via the dimming instruction signal unit 10. Thus, the MOSFETs 12, 13 of the DC/AC conversion unit 6 are driven at the driving frequency f1 (Hz). The ON-state of the dimming instruction signal is kept until the voltage phase-controlled by the dimmer is turned OFF, the light emission of the photocoupler 9 falls, and then the dimming instruction signal is turned in an OFF state. When the voltage phase-controlled by the dimmer is turned ON again, the dimming instruction signal is turned ON via the photocoupler 9. Furthermore, when the voltage phase-controlled by the dimmer is turned OFF, the dimming instruction signal to be transmitted to the switching circuit 25 via the photocoupler 9 is turned OFF, so that operations of the MOSFETs 12, 13 of the DC/AC conversion unit 6 are stopped.

Figure 2:
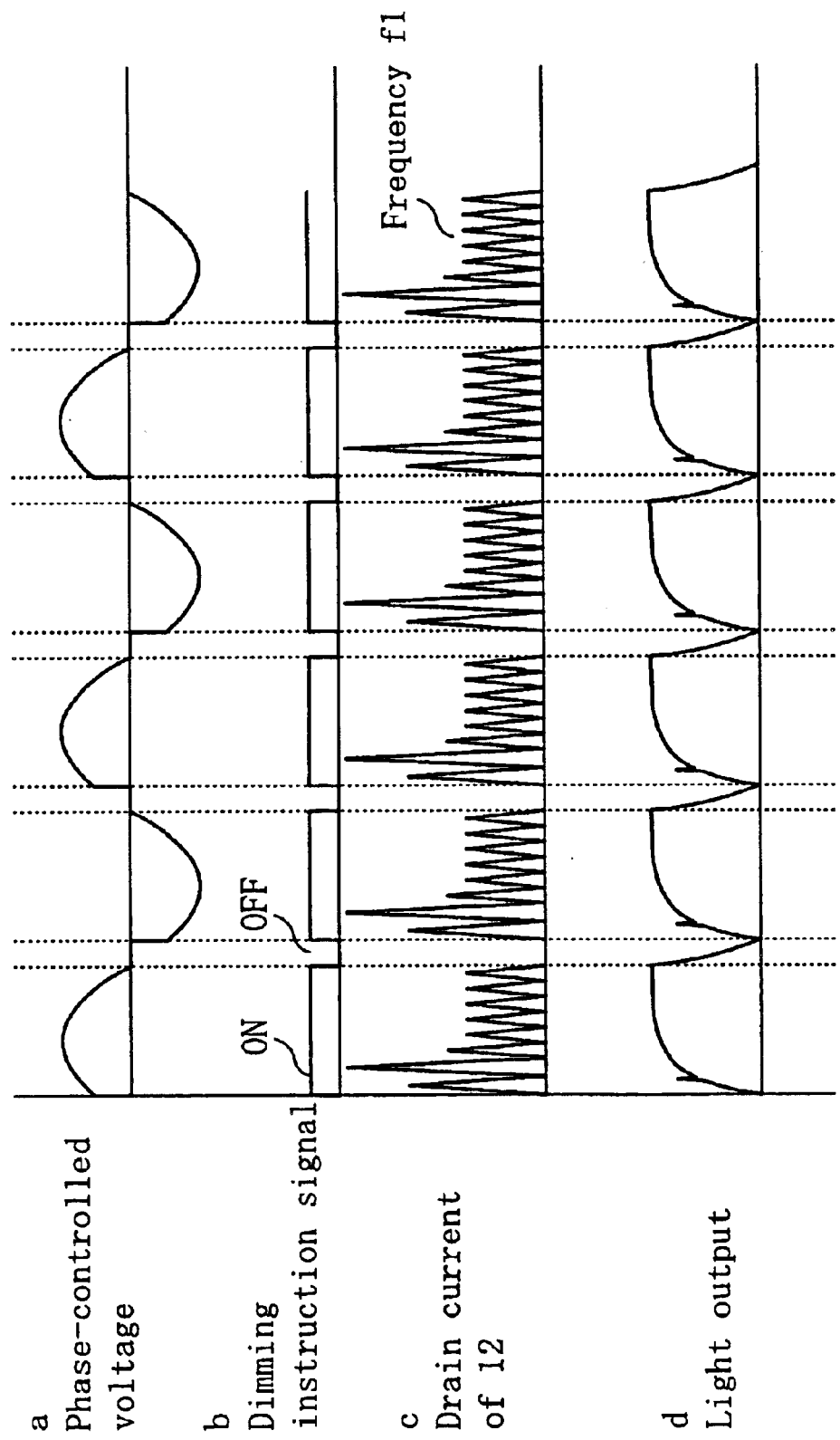
FIG. 2 is a graph showing characteristics of circuit and lamp in the discharge lamp operating apparatus of EMBODIMENT 1.

A waveform showing the state in which the dimming instruction signal is repeatedly turned ON/OFF is illustrated in FIG. 2b. To show the relationship between the waveform of the dimming instruction signal (FIG. 2b) and operations of the MOSFETs 12, 13, the MOSFET 12 is taken up as an example and the waveform of the drain current of the MOSFET 12 is illustrated in FIG. 2c using the same time axis used for indicating the waveform of the dimming instruction signal (FIG. 2b). The drain current of the MOSFET 13 has the same waveform as that of the MOSFET 12 shown in FIG. 2c. Moreover, in FIG. 2d, the waveform of light emitted from an electrodeless fluorescent lamp is illustrated. As shown in FIG. 2, it has been experimentally confirmed that with provision of the dimming control unit 7 using the photocoupler 9, operations of the MOSFETs 12, 13 are turned ON/OFF while being accurately synchronized with turn-ON/OFF of the voltage phase-controlled by the dimmer 2, so that light output from the electrodeless fluorescent lamp 3 in accordance with the operations is obtained. Note that the state of being synchronized here means to be the state of substantially being synchronized including the cases where a short time delay of rise and fall times of the photocoupler 9 or the like occurs. As for such a short time delay, a delay time is shorter than a cycle of an input alternating current voltage. Therefore, no influence is given to light output.

Note that in the DC/AC conversion unit 6 in the electrodeless fluorescent lamp of EMBODIMENT 1, an MOSFET is used as a switching element. However, needless to say, a power transistor may be used.

Hereinafter, the frequency of a high frequency voltage which the ballast circuit 4 applies to the electrodeless fluorescent lamp 3 in the electrodeless compact self-ballasted fluorescent lamp of this embodiment will be briefly described. The frequency in this embodiment is 1 MHz or less (e.g., 50–500 kHz), which is a relatively low frequency region, compared to frequency in an ISM band which is practically used in general, i.e., 13.56 MHz or several MHz. The following is the reason why frequency in the low frequency region is used. First, when the electrodeless compact self-ballasted fluorescent lamp is operated in a relatively high frequency region, i.e., at, e.g., 13.56 MHz or several MHz, a large noise filter is required to suppress line noise generated from a high frequency power source circuit in the ballast circuit (circuit board) and thus the volume of the high frequency power source circuit is increased. Moreover, there are strict regulations for high frequency noise established by law. Therefore, if high frequency noise is emitted or propagated from the lamp, the lamp has to include an expensive shield in order to meet the regulations. This will be a stumbling block preventing cost reduction. On the other hand, when the electrodeless fluorescent lamp is operated in a frequency region of 50 kHz to 1 MHz, low-cost, widely-used electronic parts for general electronic apparatuses can be used as members constituting a high frequency power circuit and also members with a small size can be used. Accordingly, reduction in cost and size can be achieved, resulting in great advantages. However, the electrodeless fluorescent lamp of this embodiment is not limited to operations at 1 MHz or less, but can be also operated in a frequency region of 13.56 MHz or several MHz.

As has been described, with the discharge lamp operating apparatus of EMBODIMENT 1, the DC/AC conversion unit 6 can be intermittently operated so as to be synchronized with turn-ON and turn-OFF of the voltage phase-controlled by the dimmer 2. Thus, a dimming operation of a dimming electrodeless fluorescent lamp can be stably performed. Therefore, inconveniences such as flickering and an operation failure due to an unstable operation of the lamp, which have been described as problems to be solved, are not caused.

Moreover, the discharge lamp operating apparatus described in EMBODIMENT 1 of the present invention is a lamp operating apparatus which can not only perform stable dimming but also effectively and fully utilize power input in an ON-period (conduction period) of the phase-controlled voltage during the entire ON-period. In other words, a dimming range of the discharge lamp operating apparatus of EMBODIMENT 1 is larger than that of a known dimming lamp operating apparatus in which an intermittent operation of the DC/AC conversion unit 6 is not synchronized with the phase-controlled voltage and thus a period for supplying power to a discharge lamp becomes shorter than the conduction period of the phase-controlled voltage.

EMBODIMENT 2

A discharge lamp operating apparatus in accordance with EMBODIMENT 2 of the present invention has a similar configuration to that of EMBODIMENT 1 but is different from EMBODIMENT 1 in the configuration of the dimming control unit 7.

This embodiment is different from EMBODIMENT 1 in that a photocoupler 9 whose rise and fall times are longer than those of the photocoupler 9 of EMBODIMENT 1 is used. Thus, in the discharge lamp operating apparatus of this embodiment, the DC/AC conversion unit 6 is intermittently operated so as to be synchronized with turn-ON and turn-OFF of the phase-controlled voltage always with a certain time difference. The certain time difference is a response time of the photocoupler 9 and, for example, is longer than several % of a cycle of an input alternating current voltage.

Figure 10:
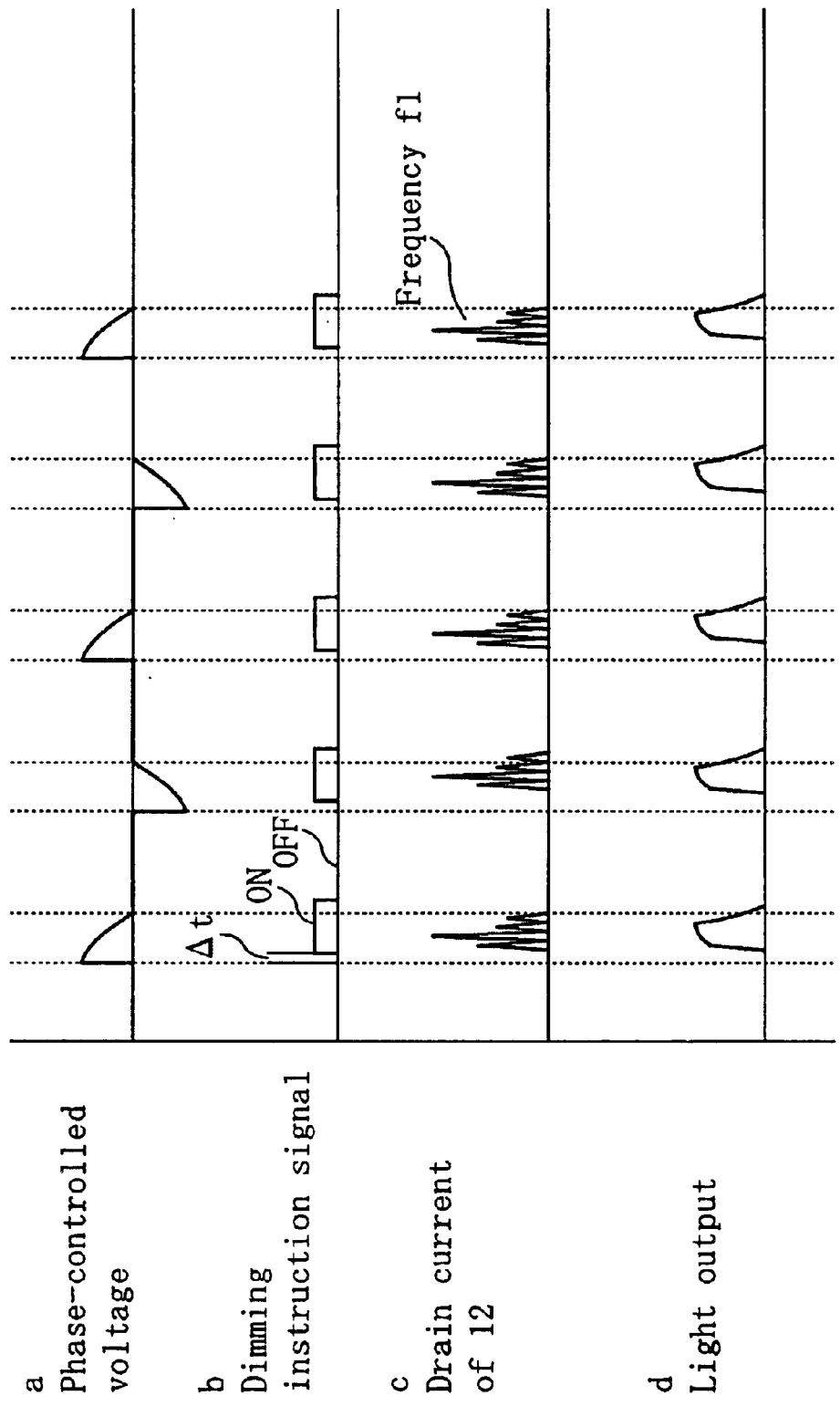
FIG. 10 is a graph showing characteristics of circuit and lamp in the discharge lamp operating apparatus of EMBODIMENT 2.

Next, characteristics and an operation of a discharge lamp operating apparatus of this embodiment will be described based on FIG. 10.

In each of FIGS. 10a through 10d showing waveforms, the abscissa indicates the time axis and the same scale is used. FIG. 10a shows the waveform of a voltage phase-controlled by the dimmer 2. It can be seen from FIG. 10a that the conduction angle of a triac of the dimmer 2 becomes closer to π. This shows that a considerably deep dimming is performed.

FIG. 10b shows a dimming instruction signal sent from the dimming control unit 7 to the DC/AC conversion unit 6 when the phase-controlled voltage as shown in FIG. 10a is input to the ballast circuit 4. As can be understood from a comparison between FIGS. 10a and 10b, after the phase-controlled voltage is turned ON, the dimming instruction signal from the dimming control unit 7 is sent to the DC/AC conversion unit 6 with a delay of time Δt.

Following this delay, the drain current of the MOSFET 12 as a switching element of the DC/AC conversion unit 6 is as shown in FIG. 10c. The drain current of the MOSFET 13 is almost the same as that of FIG. 10c, and therefore will not be shown.

When the drain currents of MOSFETs 12, 13 flow, the electrodeless fluorescent lamp 3 emits light. The light output thereof is as shown in FIG. 10d. Since the time difference Δt is constant, the emitted light is always constant. Therefore, flickering of the electrodeless fluorescent lamp 3 does not occur.

However, for the drain currents of MOSFETs 12, 13, large energy is required to start an operation of the electrodeless fluorescent lamp 3. Therefore, a large electric current flows at the moment of operating the lamp, as shown in FIG. 10c. The turn-ON of the dimmer instruction signal is delayed from that of the phase-controlled voltage by a Δt time. Accordingly, rises of the drain currents of the MOSFETs 12, 13 are delayed, so that not only time which it takes to supply high frequency power to the electrodeless fluorescent lamp 3 is reduced according to the delay time, thereby shortening a light emitting time of the electrodeless fluorescent lamp 3, but also light output of the electrodeless fluorescent lamp 3 is reduced, compared to that in the case where the time difference Δt is substantially 0, because the operation of the DC/AC conversion unit 6 is stopped with the highest phase-controlled voltage immediately after the phase-controlled voltage has been turned ON.

In this embodiment, the time difference (time Δt) between the timings of turn-ON or turn-OFF of the phase-controlled alternating current voltage and the start timings of operation period or non-operation period of an intermittent operation by the DC/AC conversion unit 6 is kept constant, thus preventing flickering of the discharge lamp. This timing difference is achieved by utilizing a response time of the phoptocoupler 9 in this embodiment. However, the timing difference may be achieved using a delay circuit. Moreover, when the time difference Δt is a little shorter than a cycle of an alternating current voltage, the start timings of operation period and non-operation period of the intermittent operation by the DC/AC conversion unit 6 appear to be shifted so as to come before the turn-ON and the turn-OFF of the phase-controlled alternating current voltage, respectively. In this case, flickering of the discharge lamp is also prevented. Note that considering reduction in light output, it is preferable that the time difference is smaller, and it is more preferable that the time difference is substantially 0.

EMBODIMENT 3

A discharge lamp operating apparatus in accordance with EMBODIMENT 3 of the present invention is a discharge lamp operating apparatus for performing a dimming operation of an electrodeless fluorescent lamp. The discharge lamp operating apparatus has a similar configuration to that of EMBODIMENT 1 but is different from that of EMBODIMENT 1 in the configuration of the DC/AC conversion unit 6.

Figure 3:
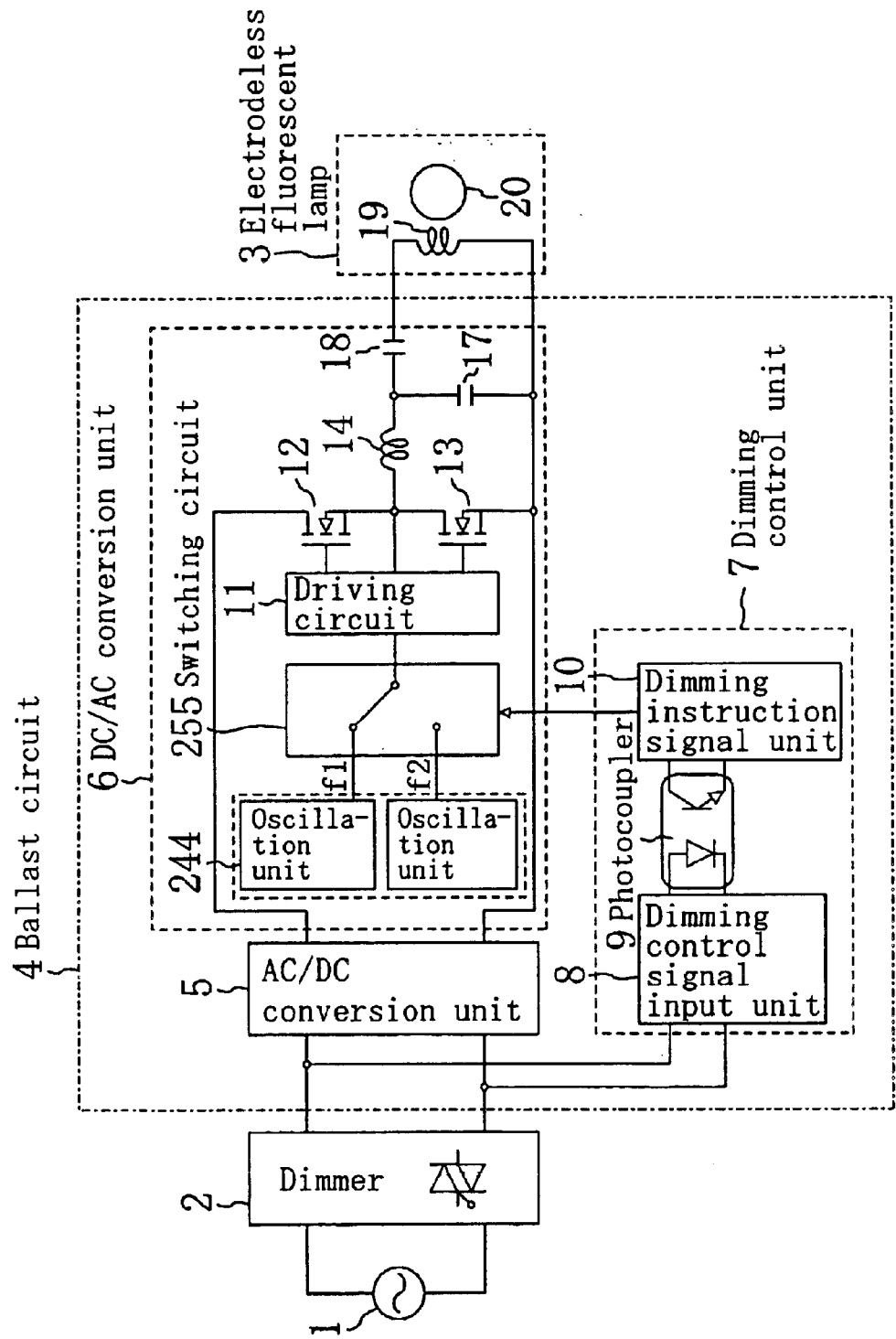
FIG. 3 is a circuit diagram illustrating the configuration of a discharge lamp operating apparatus in accordance with EMBODIMENT 3 of the present invention.

FIG. 3 schematically illustrates a ballast circuit of a discharge lamp operating apparatus in accordance with EMBODIMENT 3 of the present invention. Each of the same components as those of EMBODIMENT 3 is identified by the same reference numeral, and therefore duplicated description will be omitted.

In FIG. 3, the DC/AC conversion unit 6 includes an oscillation unit 244, a switching circuit 255, a driving circuit 11, MOSFETs 12, 13, a resonance inductor 14 and resonance capacitors 17, 18. Note the oscillation unit 244 includes an oscillation section A of an oscillation frequency f1 (Hz) and an oscillation section B of an oscillation frequency f2 (Hz). The frequency f2 is set to be a lower frequency than the frequency f1. The driving circuit 11 is so configured to be connected to the oscillation section A when a dimming control signal is output from the dimming instruction signal unit 10 to the switching circuit 255, and to be connected to the oscillation section B when a dimming control signal is not output from the dimming instruction signal unit 10 to the switching circuit 255.

Hereinafter, an operation of the discharge lamp operating apparatus of EMBODIMENT 3 will be briefly described.

The principle on which a discharge lamp is operated in EMBODIMENT 3 is the same as that in EMBODIMENT 1, and therefore duplicated description will not be given.

An operation of the dimming control unit 7 corresponding to a phase-controlled voltage to be input from the dimmer 2 to the dimming control unit 7 is basically the same as that in EMBODIMENT 1, and therefore detail description will be omitted.

With the technique using a photocoupler 9 as described in EMBODIMENT 1, a binarized ON/OFF dimming instruction signal output can be obtained from a phase-controlled voltage which has been input to the dimming control signal unit 8.

When the dimming instruction signal is transmitted to the switching circuit 255 via a built-in transistor provided in the photocoupler 9, i.e., when the dimming instruction signal is ON, the oscillation unit A of the oscillation frequency f1 (Hz) and the driving circuit 11 are connected to each other in the switching circuit, so that the MOSFETs 12, 13 as switching elements are alternately driven at the switching frequency f1 (Hz). Thus, a high frequency voltage is generated to operate an electrodeless fluorescent lamp 3.

On the other hand, when the dimming instruction signal is not transmitted to the switching circuit 255 via the built-in transistor provided in the photocoupler 9, i.e., when the dimming instruction signal is OFF, the oscillation unit A of the oscillation frequency f2 (Hz) and the driving circuit are connected to each other in the switching circuit 255, so that the MOSFETs 12, 13 as switching elements are alternately driven at the switching frequency f2 (Hz). However, in this case, the frequency f2 (Hz) of the oscillation unit B is set to be lower than the frequency f1 of the oscillation unit A, so that high frequency current flowing in the induction coil 19 of the electrodeless fluorescent lamp 3 is less than that in the case where the dimming instruction signal is ON. In this manner, the oscillation frequency of the oscillation unit 244 is set so that at the oscillation frequency f2 (Hz), electric current flows through the induction coil 19 but the electrodeless fluorescent lamp 3 is not operated. This is because at the oscillation frequency f2, a discharge is not generated in the discharge valve 20 or only an insufficient amount discharge for emitting light is generated. That is to say, a voltage of f1 (Hz) is a high frequency voltage with which the electrodeless fluorescent lamp 3 is operated and a voltage of f2 (Hz) is a high frequency voltage with which the electrodeless fluorescent lamp 3 is not operated.

To help understanding of the operation of the lamp operating apparatus of EMBODIMENT 3, waveforms of a phase-controlled voltage, a dimming instruction signal, a drain current of the MOSFET 12 and light emitted from the electrodeless fluorescent lamp 3 are shown in FIGS. 4a, 4b, 4c and 4d, respectively.

Figure 4:
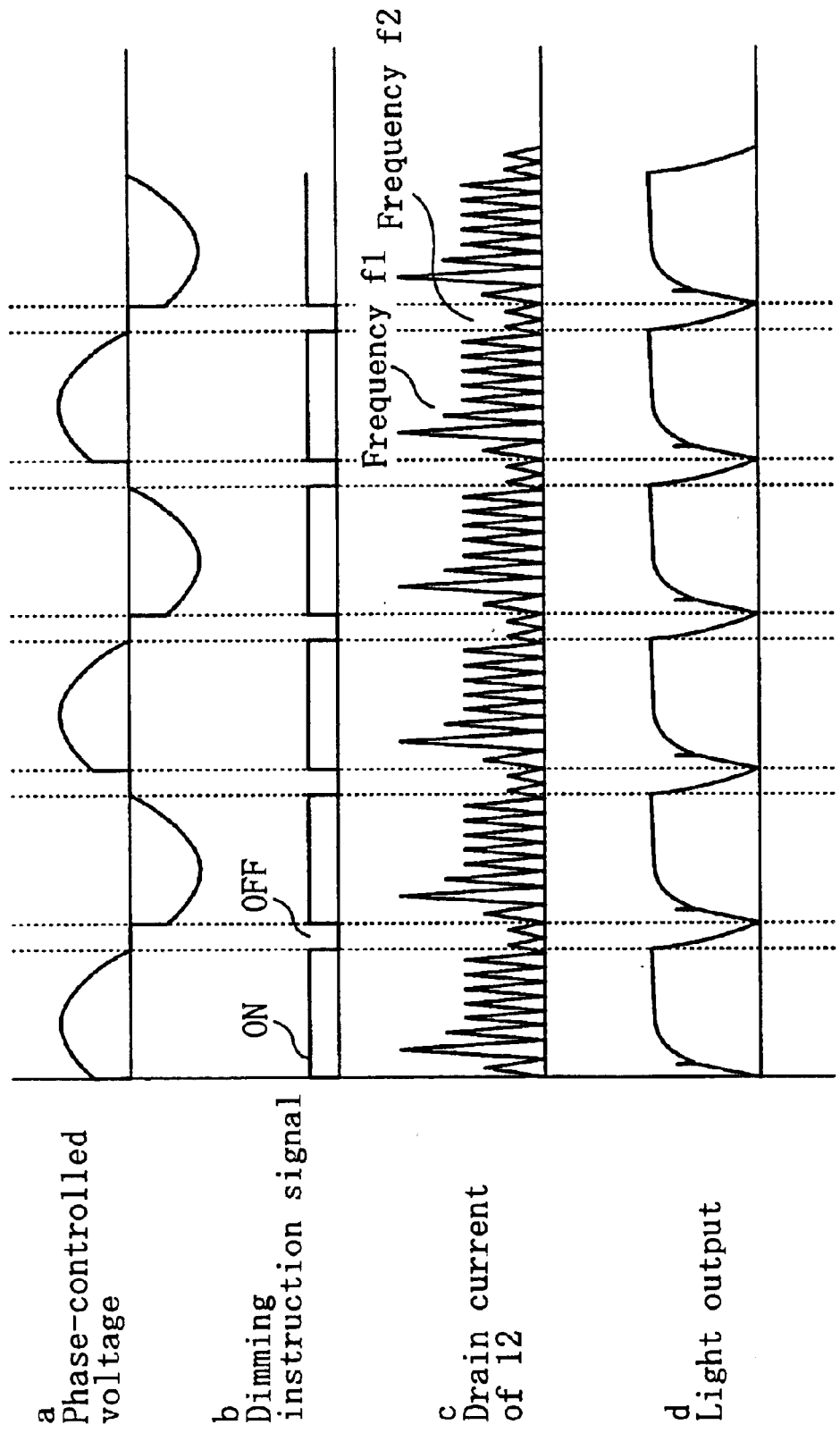
FIG. 4 is a graph showing characteristics of circuit and lamp in the discharge lamp operating apparatus of EMBODIMENT 3.

When FIG. 2c and FIG. 4c are compared to each other, it can be seen that if electric current with which the lamp is not operated is passed during a non-operation period of the electrodeless fluorescent lamp 3 (FIG. 4c) as in EMBODIMENT 3, light output from the electrodeless discharge lamp when the phase-controlled voltage is turned ON rises with less electric current than that when electric current is not passed during a non-operation period, as described in EMBODIMENT 1 (FIG. 2c). This is because an ionized light emitting gas exists in the electrodeless discharge valve 20 even during a non-operation time and thus energy for a next operation of the electrodeless discharge valve 20 is reduced. When less energy is required for operating the lamp, the operation can be easily performed. Accordingly, a rise of light flux becomes faster (i.e., a rise of light output shown in FIG. 4d becomes more rapid than that in FIG. 2d).

With the above-described configuration of EMBODIMENT 3, even if a dim level for the electrodeless fluorescent lamp 3 is set to be deep so that the ON-period in which the MOSFETs 12, 13 of the DC/AC conversion unit 6 are driven is reduce, i.e., the duty ratio is reduced, a reliable dimming operation synchronized with the phase controlled voltage can be performed.

Note that in this embodiment, the frequency f2 (Hz) of the oscillation unit B is set to be lower than the frequency f1 (Hz) of the oscillation unit A. By contrast to this, however, the frequency f2 (Hz) of the oscillation unit B may be set to be higher than the frequency f1 (Hz) of the oscillation unit A.

Moreover, in EMBODIMENT 3 described above, the driving frequency is set to be different levels, i.e., f1 and f2 in an operation period and a non-operation period, respectively. Thus, high frequency current flowing in the electrodeless discharge valve 20 during the non-operation period is less than high frequency current flowing in the electrodeless discharge valve 20 during the operation period. In the same manner, even if gate-source voltages of the MOSFETs 12, 13 are set differently in an operation period and a non-operation period to control drain currents, so that high frequency current flowing in the discharge valve 20 during a non-operation period is less than that during an operation period, the same effects as those of EMBODIMENT 3 can be achieved.

EMBODIMENT 4

EMBODIMENT 4 is an electrodeless discharge lamp operating apparatus in accordance with another example of the present invention. Note that each part having the same configuration as that in EMBODIMENT 1 or EMBODIMENT 3 is identified by the same reference numeral as that in EMBODIMENT 1 or EMBODIMENT 3 and the description thereof will be omitted.

Figure 5:
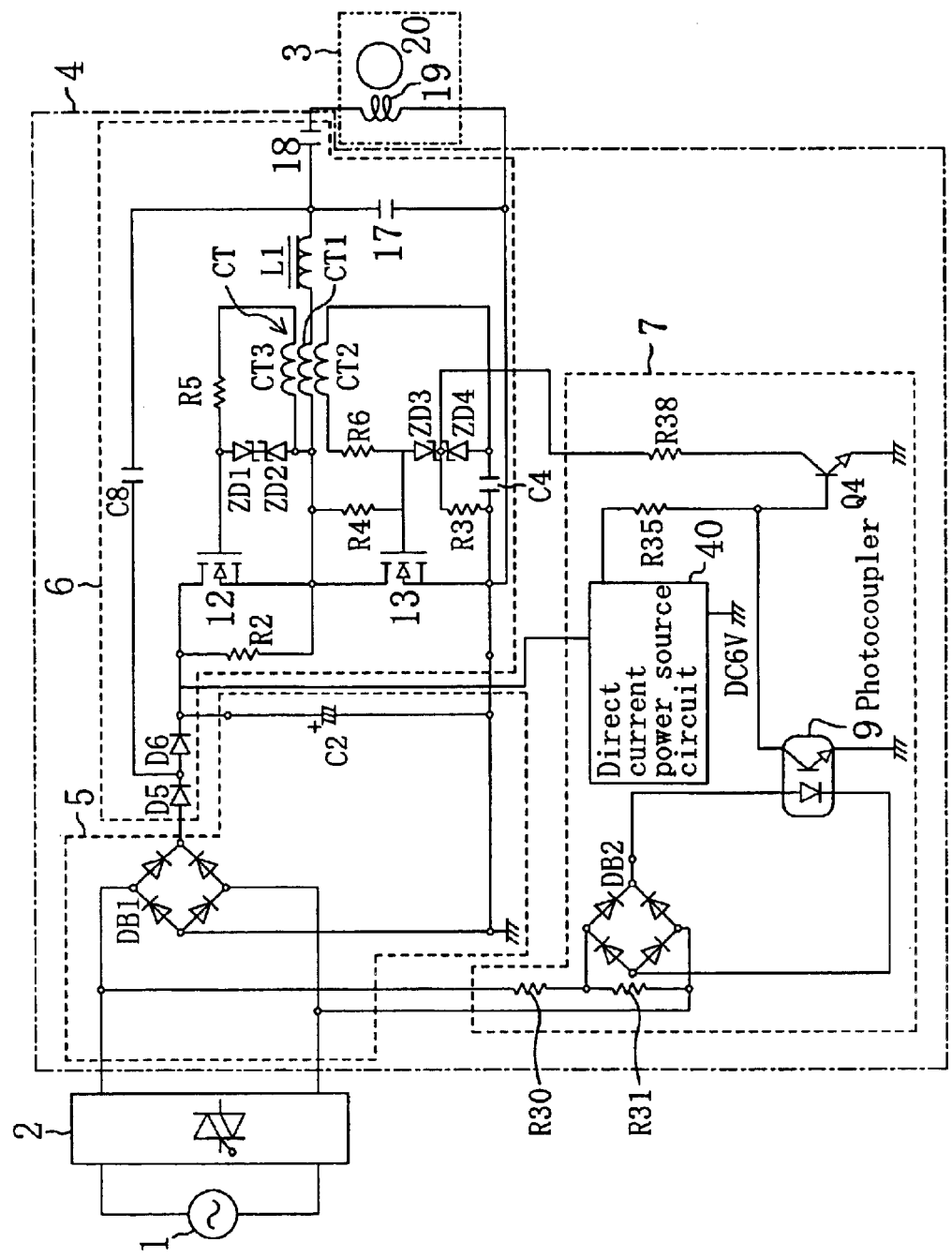
FIG. 5 is a circuit diagram of a discharge lamp operating apparatus in accordance with EMBODIMENT 4 of the present invention.

FIG. 5 is a circuit diagram of an electrodeless discharge lamp operating apparatus of EMBODIMENT 4 of the present invention.

The electrodeless discharge lamp operating apparatus includes an electrodeless fluorescent lamp 3, a dimmer 2 for a phase-controlling input voltage, and a ballast circuit 4 for performing a dimming operation of the electrodeless fluorescent lamp 3 so that the dimming operation is synchronized with turn-ON and turn-OFF period of a voltage phase-controlled by the dimmer 2, i.e., a conduction period of a voltage phase-controlled by the dimmer 2.

Hereinafter, the configuration and an operation of the electrodeless discharge lamp operating apparatus of EMBODIMENT 4 will be described.

The ballast circuit 4 includes an AC/DC conversion unit 5, a DC/AC conversion unit 6 and a dimming control unit 7.

The AC/DC conversion unit 5 includes a diode bridge DB1 and an electrolytic capacitor C2. Needless to say, a resistor for preventing rush current and a noise preventing filter may be connected to the AC/DC conversion unit 5.

When power is turned on, the voltage phase-controlled by the dimmer 2 is rectified by the diode bridge DB1 of the AC/DC conversion unit 5, smoothed by the electrolytic capacitor C2, and then sent as an output to the DC/AC conversion unit 6.

Next, to describe the configuration and an operation of the DC/AC conversion unit 6, assume the state in which a dimming instruction signal is not sent from the dimming control unit 7 to the DC/AC conversion unit 6, i.e., a transistor Q4 is in an OFF state and MOSFETs 12, 13 as switching elements of the DC/AC conversion unit 6 are in an ON state. Then, this state will be described.

An input voltage from the commercial power line 1 to the dimmer 2 and then phase-controlled is rectified by the AC/DV conversion unit 5 to charge a smooth capacitor C2, a trigger capacitor C4 of the MOSFET 13 of the DC/AC conversion unit 6, and a capacitor C8 functioning as a charge pump circuit.

When the charge voltage of the trigger capacitor C4 reaches the Zener voltage of a Zener diode ZD4, electric current flows through resistors R2, R4 and R3 and the gate voltage is supplied to between the gate and source of the MOSFET 13, so that the MOSFET 13 is turned ON.

When the MOSFET 13 is turned ON, the voltage of the smooth capacitor C2 is initially lower than the power voltage. Thus, electric current flows from the power source 1 to the dimmer 2, and furthermore flows, via the AC/DC conversion unit 5, through the resonance capacitors 18, 17, an inductor L1, the induction coil 19, a primary winding CT1 of a transformer CT, and the MOSFET 13.

On the other hand, by the electric current flowing through the primary winding CT1 of the transformer CT, an induced voltage is generated at the secondary winding CT3 of the transformer CT to supply the gate voltage to the MOSFET 13, so that the MOSFET 13 is continuously in the ON state.

However, when the electric current flowing through each of the windings of the transformer CT is increased, the core of the transformer CT itself becomes magnetically saturated after a certain period of time. Thus, the induced voltage of the secondary winding CT3 of the transformer CT is not generated and the gate voltage can not be supplied to the MOSFET 13, so that the MOSFET 13 is turned OFF.

Note that the direction in which electric current flows through the MOSFET 13 connected to the secondary winding CT2 of the transformer CT is different from the direction in which electric current flows between the gate and source of the MOSFET 12 connected to the secondary winding CT3 of the transformer CT. Thus, when the MOSFET 13 is turned OFF, the gate voltage of the MOSFET 12 is increased. Accordingly, the MOSFET 12 is turned ON by the increase in the voltage.

When the MOSFET 12 is turned ON, electric current flows through the MOSFET 12, the transformer CT, the inductor L1, the capacitor C17, and a serial circuit formed of the capacitor 18 and the induction coil 19 and connected to the capacitor C17 in parallel. The current resonates with the inductor L1, the resonance capacitor C18, C17 and the induction coil 19.

Furthermore, when the electric current flowing through each of the windings of the current transformer CT is increased, the core of the current transformer CT itself becomes magnetically saturated again. When the core of the electric transformer CT is magnetically saturated, output of the secondary winding CT2 disappears, the gate voltage can not be supplied to the MOSFET 12, so that the MOSFET 12 is turned OFF.

Subsequently, by repeating the above-described operation, ON and OFF periods can be alternately switched at the driving frequency f1 (Hz), e.g., 200 (kHz) in each of the MOSFETs 12, 13.

Thus, it is possible to generate high frequency voltage in a resonance circuit of the DC/AC conversion unit 6, supply magnetic energy to the electrodeless discharge valve 20 via the induction coil 19, and then excite a light emitting gas enclosed in the electrodeless discharge valve 20 to make the light emitting gas emit ultraviolet light. By this ultraviolet radiation, a luminophor (not shown) applied to the inside of the electrodeless discharge valve 20 is excited to emit light, so that the electrodeless fluorescent lamp 3 is operated.

Next, an operation of the electrodeless discharge lamp operating apparatus in the case where a dimming instruction signal is transmitted from the dimming control unit 7 to the DC/AC conversion unit 6 to perform dimming operation will be described.

The voltage phase-controlled by the dimmer 2 (see FIG. 4a) is divided between the resistors R30 and R31 so that an appropriate voltage for driving the photocoupler 9 is obtained. The obtained voltage is input to the diode bridge DB2, and then full-wave rectified voltage is applied to a photodiode of the photocoupler 9. Accordingly, the phase-controlled voltage is turned ON and at the same time the voltage full-wave rectified is applied to the photodiode of the photocoupler 9, so that the photodiode emits light. Thus, electric current flows in a phototransistor of the photocoupler 9 to turn ON the photocoupler 9.

When the photocoupler 9 is turned ON, the base potential of the transistor Q4 becomes 0, the collector current of the transistor Q4 does not flow. Therefore, Q4 does not influence ON/OFF operations of the MOSFETs 12 and 13. Drain currents as shown in FIG. 4c flows through the MOSFETs 12, 13 and a high frequency voltage is generated in the DC/AC conversion unit 6, so that the electrodeless fluorescent lamp is operated.

Electric current obtained due to turn-On of the voltage phase-controlled by the dimmer 2 and flowing through the phototransistor continuously flows, i.e., the electrodeless fluorescent lamp 3 is continuously operated, until the phase-controlled voltage is turned OFF and then a voltage is not applied to the photodiode via the diode bridge DB2.

When the voltage phase-controlled by the dimmer 2 is turned OFF, the voltage applied to the photocoupler 9 is 0. Accordingly, the photocoupler 9 is turned OFF. In this state, the direct current voltage is applied to the base of the transistor Q4 via the resistor R35 by a direct current power source circuit (e.g., a three-terminal regulator) 40 and thus a collector current of Q4 flows therein. Thus, a resistor 38 is inserted so as to be parallel to the resistor R3. Then, the gate voltage of the MOSFET 13 is reduced, the MOSFET 12 is turned OFF, and a high frequency voltage is not applied to the electrodeless discharge valve 20, so that the fluorescent lamp 3 becomes in a non-operation state. The MOSFET 12 is continuously in the OFF state until the voltage phase-controlled by the dimmer 2 is turned ON again.

In this manner, the MOSFETs 12, 13 are repeatedly turned ON/OFF so as to be synchronized with turn-ON and turn-OFF of the phase-controlled voltage. Furthermore, the electrodeless fluorescent lamp 3 repeatedly becomes in an operation state or a non-operation state so as to be synchronized with turn-ON and turn-OFF of the MOSFETs 12, 13. Note that a connection portion of the resistor R38 in the DC/AC conversion unit 6 may be located not only between two Zener diodes, i.e., ZD3 and ZD4, but also between the resistor R6 and the Zener diode ZD3. In either case, the electrodeless fluorescent lamp 3 is repeatedly turned ON/OFF.

Therefore, needless to say, the same effects as those described in EMBODIMENT 3 described above can be obtained in this embodiment.

EMBODIMENT 5

Figure 6:
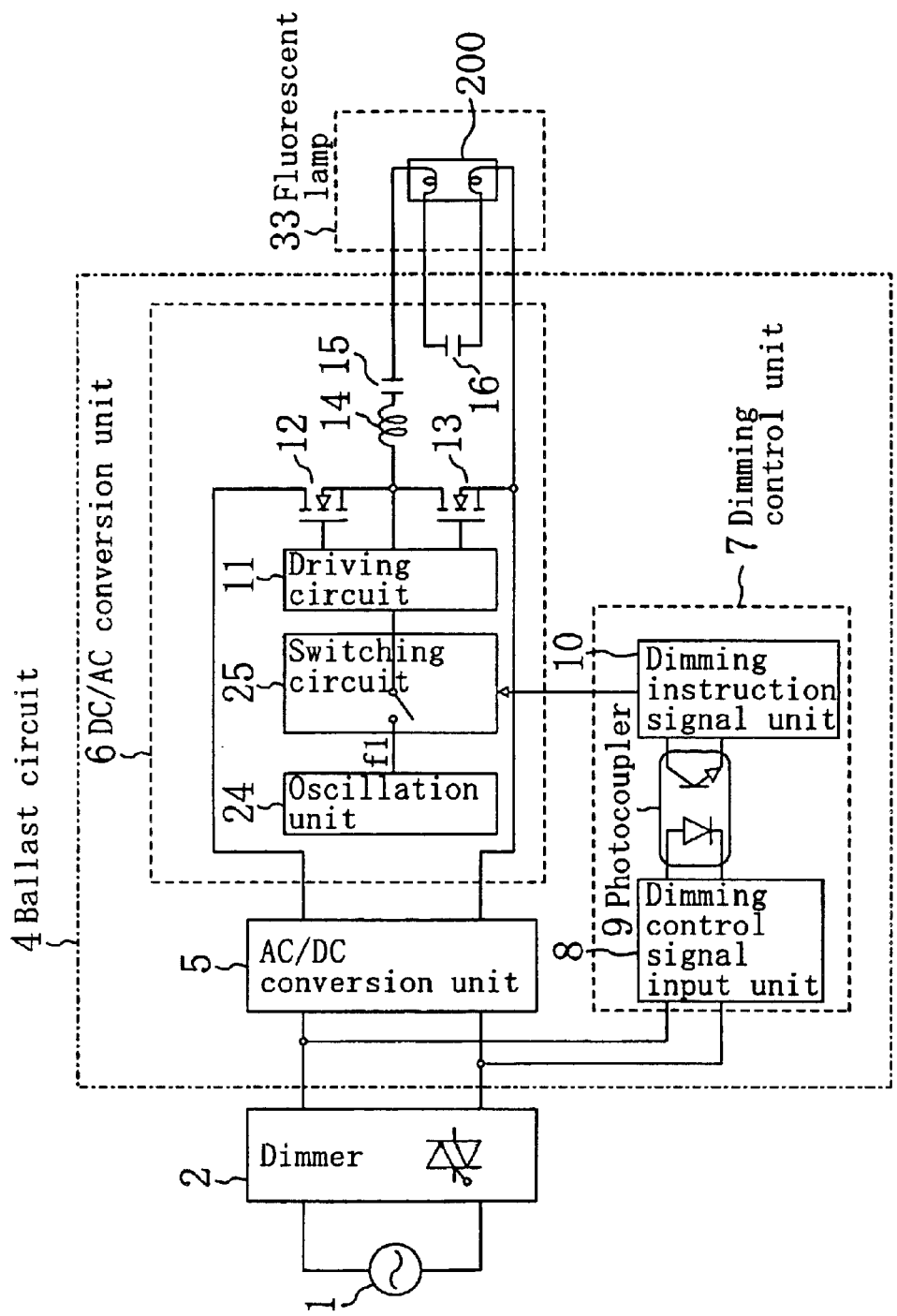
FIG. 6 is a circuit diagram illustrating the configuration of a discharge lamp operating apparatus in accordance with EMBODIMENT 5 of the present invention.

FIG. 6 is a circuit diagram of a discharge lamp operating apparatus in accordance with EMBODIMENT 5 of the present invention. The discharge lamp operating apparatus is different from that of EMBODIMENT 1 only in that a discharge lamp 200 includes an electrode and a load resonance circuit has a different configuration in order to operate a fluorescent lamp 33 including the electrode. Note that each part having the same configuration as that in EMBODIMENT 1 identified by the same reference numeral, and therefore the description thereof will be omitted.

In FIG. 6, an LC resonance circuit including the fluorescent lamp 33, a resonance inductor 14, a resonance capacitor 15 and a resonance and preheating capacitor 16 is connected between the drain and source terminals of the MOSFET 13.

A high voltage is generated as a resonance voltage in both edges of the capacitor 16 of the LC resonance circuit. When the temperatures of the electrodes are increased by preheating current which flows to the two electrodes in the discharge valve, and then thermions are easily generated from the electrodes, the breakdown of the discharge valve 200 occurs, so that discharge is started. When the discharge valve 200 starts discharge, an electric current flowing through the discharge valve 200 is controlled by the resonance inductor 14. Thus, stable discharge is maintained.

The configuration and an operation of the dimming control unit 7 of EMBODIMENT 5 is the same as those of EMBODIMENT 1. It is obvious from the description made in EMBODIMENT 1 that with the configuration of the discharge lamp operating apparatus shown in FIG. 6, dimming operation of a general discharge lamp which is dimmable and includes an electrode can be stably performed, and therefore duplicated description will not be given.

EMBODIMENT 6

Figure 7:
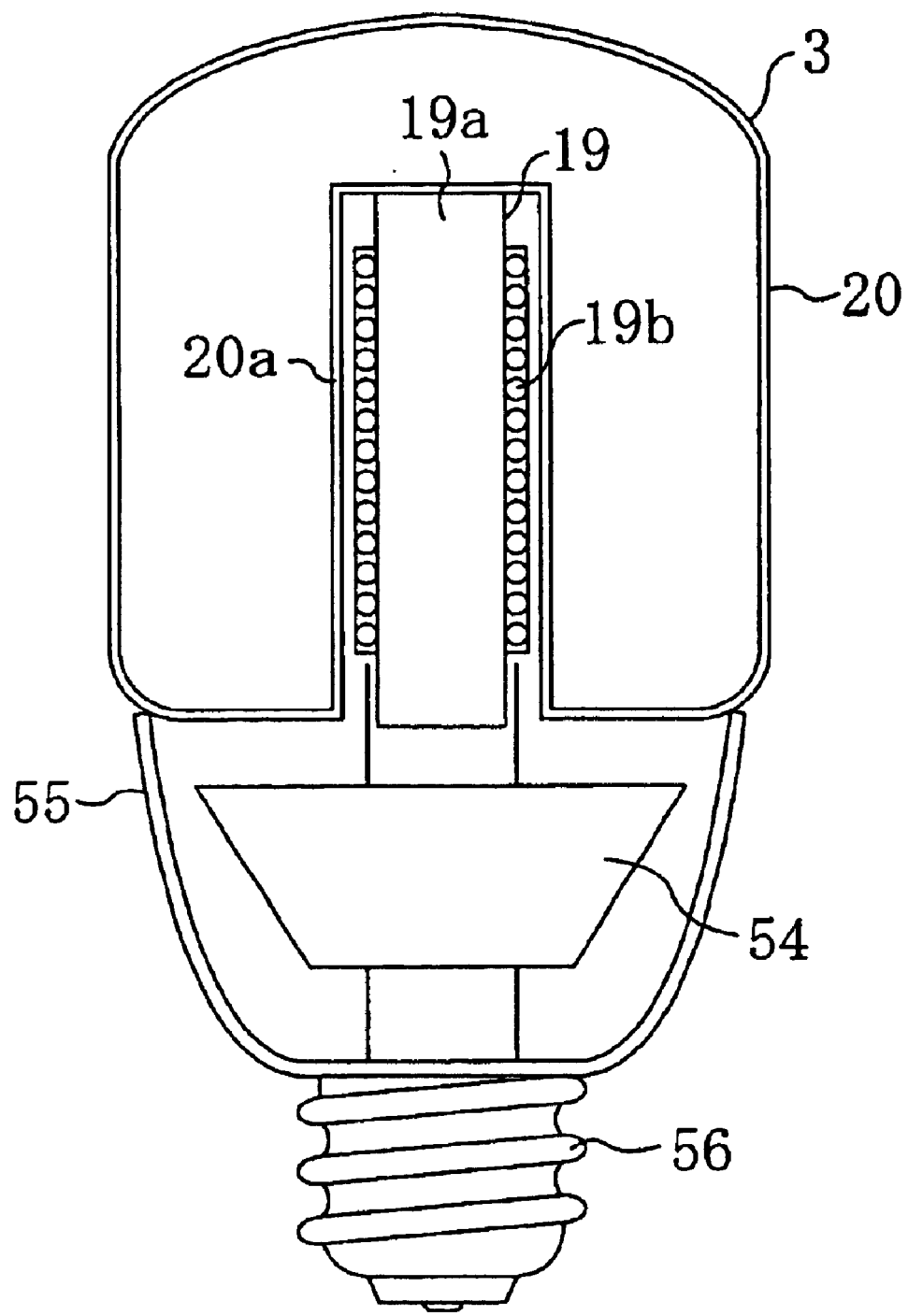
FIG. 7 is a cross-sectional view schematically illustrating a discharge lamp operating apparatus in accordance with EMBODIMENT 6 of the present invention.

Next, the configuration of a discharge lamp operating apparatus in accordance with EMBODIMENT 6 of the present invention will be described. An electrodeless compact self-ballasted fluorescent lamp is taken up as another discharge lamp operating apparatus of EMBODIMENT 6 and the configuration thereof is schematically illustrated in FIG. 7. Note that the discharge lamp operating apparatus of this embodiment is an electrodeless compact self-ballasted fluorescent lamp. However, the configuration of an electrode-including compact self-ballasted fluorescent lamp can be also used.

The electrodeless compact self-ballasted fluorescent lamp shown in FIG. 7 includes an electrodeless fluorescent lamp 3 which includes a translucent discharge valve 20 which has a cavity portion 20a and in which mercury and a noble gas such as argon (not shown) are enclosed, a base 56 such as an E26 type incandescent lamp base, a circuit board 54 on which interconnects in the configuration of a ballast circuit (e.g., a circuit shown in FIG. 6) is formed and each circuit component is mounted, and a cover 55 for containing a circuit board.

A discharge plasma for exciting mercury enclosed in the discharge valve 20 is generated by energy supplied by an alternating electromagnetic field generated by the induction coil 19 in the discharge valve. The induction coil 19 includes a ferrite magnetic core 19a and a winding 19b and is located in the cavity portion 20a of the discharge valve.

Although not shown in FIG. 7, the electrodeless fluorescent lamp 3, the circuit board 54 and the base 56 are electrically connected to each other. Thus, when the electrodeless fluorescent lamp 3 is screwed in an incandescent lamp socket with the base 56 interposed therebetween, power is supplied to the electrodeless fluorescent lamp 3, so that the electrodeless fluorescent lamp 3 is operated.

An alternating current voltage is input through the base 56 is an alternating current voltage phase-controlled by an external phase controller (e.g., an incandescent lamp dimmer).

Needless to say, the discharge lamp does not have to be an electrodeless fluorescent lamp as in this embodiment but may be an electrode-including fluorescent lamp.

Moreover, in this embodiment, the compact self-ballasted fluorescent lamp in which the electrodeless discharge lamp 3, the ballast circuit and the base are assembled as one unit has been described. However, this embodiment is not limited thereto, but may be a discharge lamp operating apparatus in which the electrodeless fluorescent lamp 3 and the ballast circuit are separately provided (i.e., an electrodeless discharge lamp operating apparatus).

OTHER EMBODIMENTS

The shape of each of the discharge lamps of EMBODIMENTs 1 through 6 may be a straight-pipe shape, a round-pipe shape, a U-shape or any other lamp shape used for general purpose illumination.

Moreover, needles to say, the discharge lamp operating apparatus of the present invention is not limited to general purpose fluorescent lamps, but may be an operating apparatus for, e.g., a fluorescent sunlamp whose action spectrum is effective for the erythemal effect and the generation of vitamin D, or a fluorescent lamp for plant rearing whose action spectrum is effective for photosynthesis and shape generation of plants.

Furthermore, a discharge lamp to be operated by the discharge lamp operating apparatus of the present invention may be a discharge lamp, such as a bactericidal lamp, in which a luminophor is not applied to a discharge valve.

Note that in EMBODIMENT 1, the dimming control unit 7 is so configured to output a signal for synchronizing a turn-ON of a phase-controlled voltage with the start timing of an intermittent operation by the DC/AC conversion unit 6. This is because a dimming operation can be more efficiently performed when the turn-ON of the phase-controlled voltage is synchronized with the start timing of an intermittent operation by the DC/AC conversion unit 6.

Figure 9:
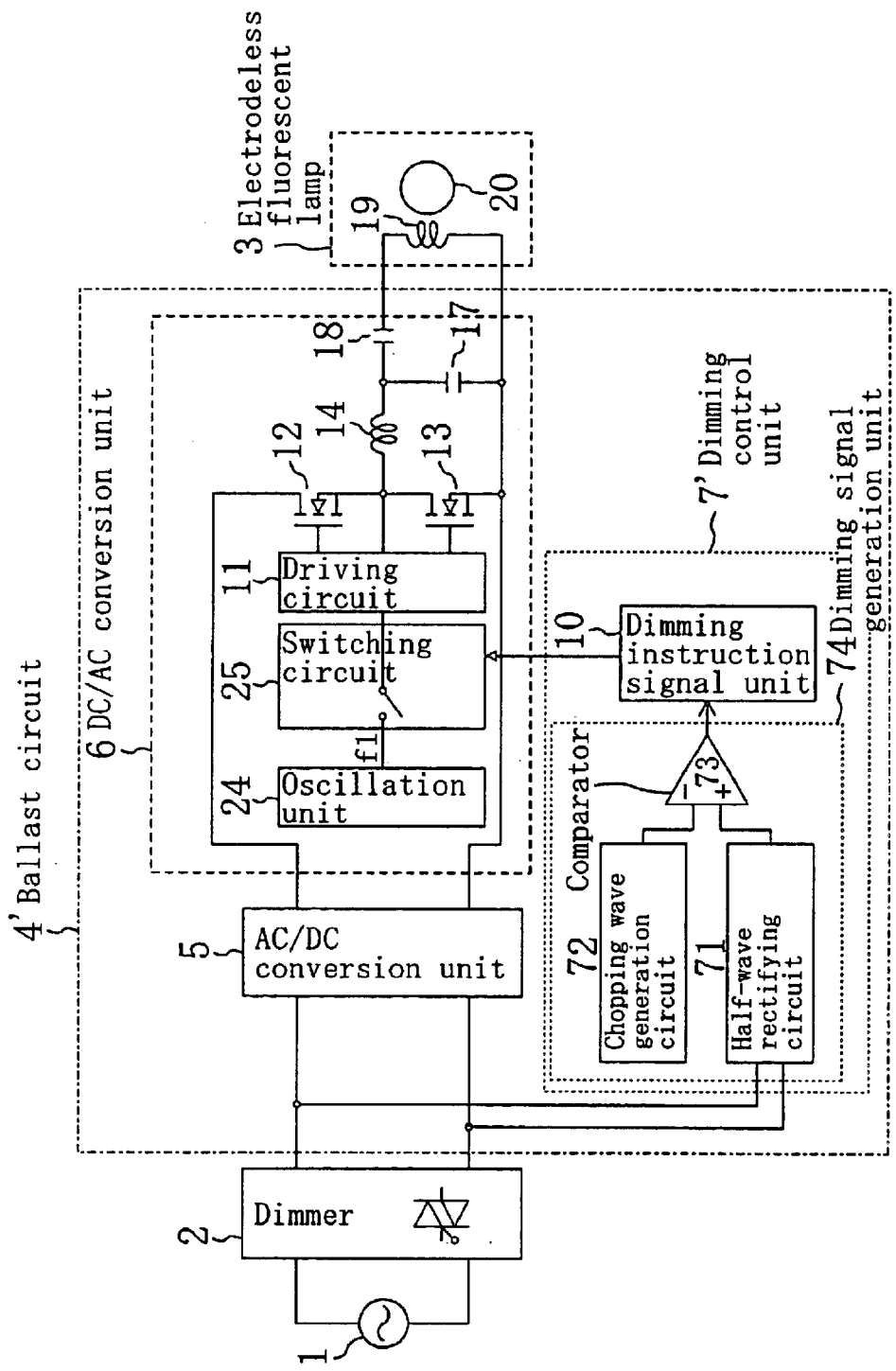
FIG. 9 is a circuit diagram illustrating the configuration of an asynchronous discharge lamp operating apparatus.

The configuration shown in FIG. 9 is the configuration of a ballast circuit 4' which is intermittently operated, but is not formed so as to synchronize a turn-ON of the ballast circuit 4' and the start timing of an operation period of an intermittent operation by the DC/AC conversion unit 6. The configuration is different from that of EMBODIMENT 1 in that the dimming control unit 7' is so configured to generate a dimming control signal and send a dimming instruction signal to the DC/AC conversion unit (inverter circuit) 6.

The dimming control unit 7' includes a dimming signal generation unit 74 and a dimming instruction signal unit 10 for sending dimming instruction signal to the DC/AC conversion unit 6. An output phase-controlled by a triac and sent form a dimmer 2 is half-wave rectified via a half-wave rectifying circuit 71, the output voltage (120 Hz) and an output voltage of a chopping wave generation circuit 72 for generating a reference voltage of a reference frequency (120 Hz) are compared to each other by a comparator 73, and then a rectangular waveform dimming signal of a constant frequency is output from the comparator 73. The dimming signal is sent to the DC/AC conversion unit 6 via the dimming instruction signal unit 10 and ON time and OFF time of the DC/AC conversion unit 6 are varied, thereby performing dimming of an electrodeless fluorescent lamp 3. As a discharge lamp, the electrodeless fluorescent lamp 3 is used, the switching frequency f1 of an inverter circuit is set to be 200 kHz, and MOSFETs 12, 13 are used as switching elements.

Figure 11:
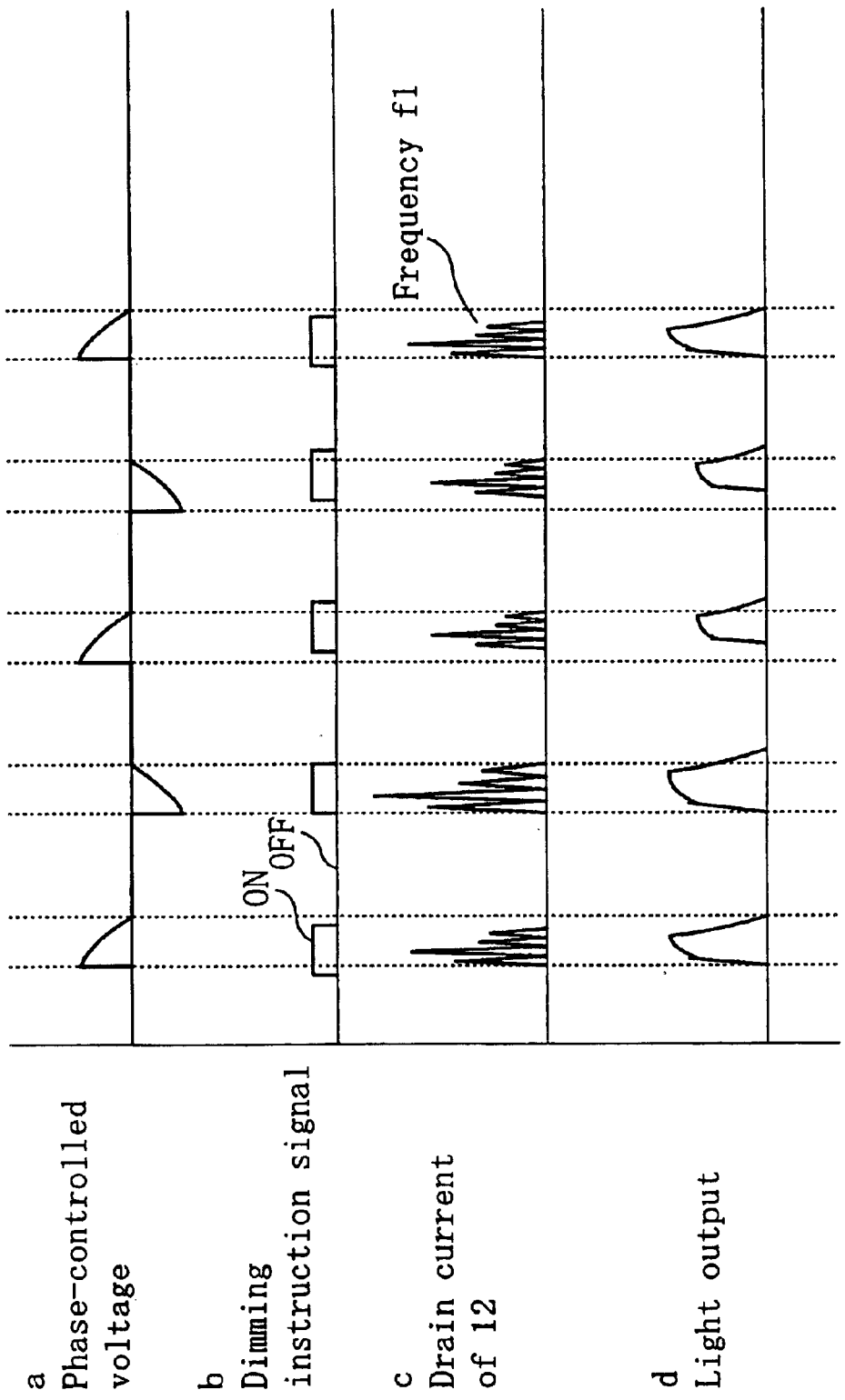
FIG. 11 is a graph showing characteristics of circuit and lamp in the discharge lamp operating apparatus of FIG. 9.
Figure 12:
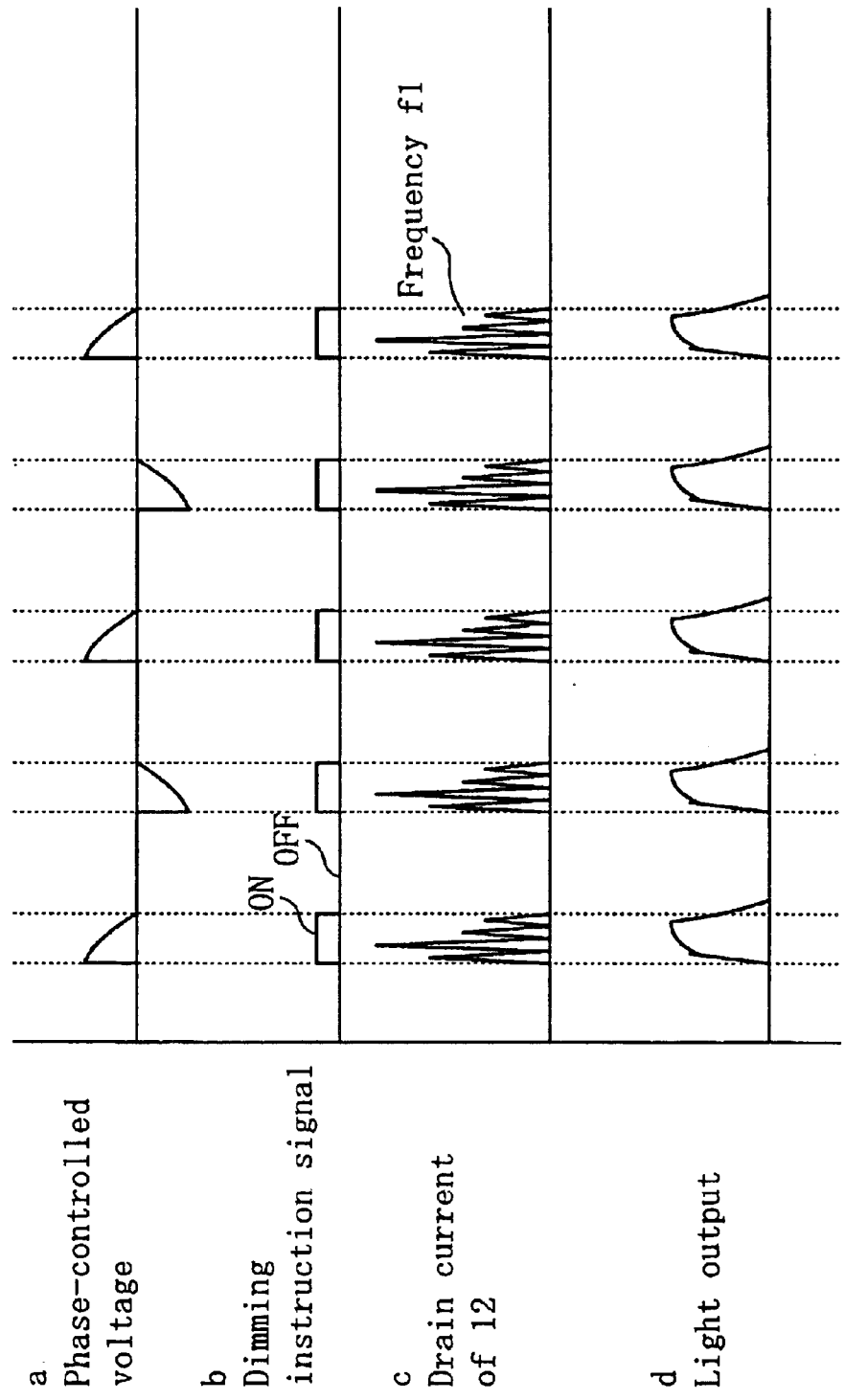
FIG. 12 is a graph showing characteristics of another circuit and another lamp in the discharge lamp operating apparatus of EMBODIMENT 1.

An example of the experiment results is shown in FIG. 11.

Hereinafter, an operation and characteristics of the discharge lamp operating apparatus of FIG. 9 will be described, based on FIG. 11. In FIGS. 11a through 11d showing waveforms, the abscissa indicates the time axis and the same scale is used. FIG. 11a illustrates the waveform of a voltage phase-controlled by the dimmer 2. It can be seen from FIG. 11a that the conduction angle of a triac of the dimmer 2 is close to $\pi$ and a considerably deep dimming is performed.

FIG. 11b illustrates a dimming instruction signal sent from the dimming control unit 7 to the DC/AC conversion unit 6 when the phase-controlled voltage as in FIG. 10a is input to the ballast circuit 4'. As can be seen from comparison between FIGS. 11a and 11b, a turn-ON of the phase-controlled voltage and a turn-ON of the dimming instruction signal are not synchronized. That is to say, the timing of turn-ON/OFF of the dimming instruction signal is different from the timing of turn-ON/OFF of the phase-controlled voltage. Furthermore, a time difference $\Delta t$ varies with time.

When the dimming instruction signal is varied in the same manner as shown in FIG. 11b, the drain current of the MOSFET 12 (or 13) is changed as shown in FIG. 11c. As a result, electrical energy supply to the electrodeless fluorescent lamp is reduced, so that light output is varied as shown in FIG. 11d. Accordingly, flickering occurs.

As a deeper dimming is performed by the dimmer 2, the drain currents of the MOSFETs 12, 13 are reduced. Accordingly, high frequency power supply to the electrodeless fluorescent lamp 3 is reduced, so that the lamp is in a state close to the threshold state between an operation state and a non-operation state.

Now, description will be made on a discharge lamp operating apparatus which can supply electrical energy allowing a bare operation of the electrodeless fluorescent lamp 3 to the electrodeless fluorescent lamp 3 in the state where the timing of turn-ON of the phase-controlled voltage and the timing of turn-ON of a dimming signal from the dimming control unit 7' are synchronized with each other. In this apparatus, when the timing of turn-ON of a dimming instruction signal is different from the timing of turn-ON of the phase-controlled voltage, as shown in FIG. 11, and the length of the difference is varied, the electrodeless fluorescent lamp 3 connected to this operating apparatus stays in a non-operation state almost all the time and only sometime is in an operation state as described above. Moreover, when a deep dimming is performed, a time difference Δt between the timing of turn-ON of the phase-controlled voltage and the timing of turn-ON of the dimming instruction signal is increased, so that the electrodeless fluorescent lamp 3 becomes in the state where it can not be operated at all.

By the way, the waveforms of a phase-controlled voltage, a dimming instruction signal, the drain current of the MOSFET 12 and a light output when the same voltage as the deep-dim-level phase-controlled voltage shown in FIG. 10a is applied to the discharge lamp operating apparatus of EMBODIMENT 1 are shown in FIGS. 12a, 12b, 12c and 12d, respectively. As can be seen from comparison between FIGS. 11d and 12d, it has been confirmed that the discharge lamp operating apparatus (FIG. 1) of the present invention in which a turn-ON/OFF of a switching element of the DC/AC conversion unit is synchronized with a turn-ON/OFF of the phase-controlled voltage by the dimmer 2 does not have flickering and light output thereof is large.

As has been described, with the discharge lamp operating apparatus of the present invention, when a voltage phase-controlled by a dimmer is input to an electrodeless or electrode-including fluorescent lamp to perform dimming of the fluorescent lamp, a stable dimming operation of the lamp without flickering and operation failure can be achieved by synchronizing the timing of a turn-ON/OFF of the phase-controlled voltage with the timing of a turn-ON/OFF of a dimming instruction signal for intermittently operating a DC/AC conversion unit Furthermore, by using the discharge lamp operating apparatus of the present invention, compared to a known discharge lamp operating apparatus, more electrical energy can be supplied to a discharge lamp and light output of the discharge lamp is increased.

INDUSTRIAL APPLICABILITY

An electrodeless discharge lamp operating apparatus, an electrodeless compact self-ballasted fluorescent lamp and a discharge lamp operating apparatus in accordance with the present invention can perform stable dimming without flickering when connected to an existing incandescent lamp dimmer. In this point, the electrodeless discharge lamp operating apparatus, the electrodeless compact self-ballasted fluorescent lamp and the discharge lamp operating apparatus are useful, and thus have high industrial applicability.

What is claimed is:

1. An electrodeless discharge lamp operating apparatus characterized in that the electrodeless discharge lamp operating apparatus includes:
    an electrodeless discharge lamp;
    an AC/DC conversion unit for converting an alternating current voltage phase-controlled by a dimmer into a direct current voltage;
    a DC/AC conversion unit for converting the direct current voltage into a high frequency voltage and driving, with the high frequency voltage, the electrodeless discharge lamp so that the electrodeless discharge lamp performs an intermittent operation including an operation period in which the electrodeless discharge lamp is operated and a non-operation period in which the electrodeless discharge lamp is turned OFF; and
    a dimming control unit for outputting to the DC/AC conversion unit a dimming instruction signal for changing a ratio between the operation period and the non-operation period; and
    the dimming control unit detects turn-ON and turn-OFF of the phase-controlled alternating voltage and substantially synchronizes timings of the turn-ON and the turn-OFF with start timings of the operation period and non-operation period of the intermittent operation by the DC/AC conversion unit, respectively.

2. The electrodeless discharge lamp operating apparatus of claim 1, characterized in that the DC/AC conversion unit drives the electrodeless discharge lamp so that the electrodeless discharge lamp performs an intermittent operation including an operation period in which the high frequency voltage is applied to the electrodeless discharge lamp to operate the electrodeless discharge lamp and a non-operation period in which the generation of the high-frequency voltage is stopped to turn OFF the electrodeless discharge lamp.

3. The electrodeless discharge lamp operating apparatus of claim 1, characterized in that the DC/AC conversion unit drives the electrodeless discharge lamp so that the electrodeless discharge lamp performs an intermittent operation including an operation period in which the direct current voltage is converted into a high frequency voltage with which the electrodeless discharge lamp is operated and then applied to the eleotrodeless discharge lamp and a non-operation period in which the direct current voltage is converted into a high frequency voltage with which the electrodeless discharge lamp is not operated and then applied to the electrodeless discharge lamp.

4. The electrodeless discharge lamp operating apparatus of claim 1, characterized in that the DC/AC conversion unit includes at least one switching element and drives by changing a voltage between gate and source of the switching element, when the direct current voltage is converted into a high frequency voltage and then applied to the electrodeless discharge lamp, so that the electrodeless discharge lamp performs an intermittent operation including an operation period in which the electrodeless discharge lamp is operated and a non-operation period in which a less amount of current is passed in the electrodeless discharge lamp than that in the operation period to turn OFF the electrodeless discharge lamp.

5. The electrodeless discharge lamp operating apparatus of claim 1, characterized in that the dimming control unit includes a photocoupler as means for transmitting the dimming instruction signal to the DC/AC conversion unit.

6. An electrodeless compact self-ballasted fluorescent lamp characterized in that the electrodeless compact self-ballasted fluorescent lamp includes: an electrodeless fluorescent lamp;
   a ballast circuit for applying a high frequency voltage to the electrodeless fluorescent lamp; and
   a base electrically connected to the ballast circuit,
   the electrodeless fluorescent lamp, the ballast circuit and the base are assembled as one unit,
   the ballast circuit includes:
   an AC/DC conversion unit for converting an alternating current voltage phase-controlled by a dimmer into a direct current voltage and outputting the converted voltage;
   a DC/AC conversion unit for converting the direct current voltage into a high frequency voltage and driving, with the high frequency voltage, the electrodeless fluorescent lamp so that the electrodeless fluorescent lamp performs an intermittent operation including an operation period in which the electrodeless fluorescent lamp is operated and a non-operation period in which the electrodeless fluorescent lamp is turned OFF; and
   a dimming control unit for outputting to the DC/AC conversion unit a dimming instruction signal for changing a ratio between the operation period and the non-operation period, and
   the dimming control unit detects turn-ON and turn-OFF of the phase-controlled alternating voltage and substantially synchronizes timings of the turn-ON and the turn-OFF with start timings of the operation period and non-operation period of the intermittent operation by the DC/AC conversion unit, respectively.

7. The electrodeless compact self-ballasted fluorescent lamp of claim 6, characterized in that the dimming control unit includes a dimming signal input unit for inputting the alternating current voltage phase-controlled by the dimmer, a photocoupler connected to the dimming signal input unit, and a dimming instruction signal unit for transmitting the dimming instruction signal from the photocoupler to the DC/AC conversion unit.

8. A discharge lamp operating apparatus characterized in that the discharge lamp operating apparatus includes:
   a discharge lamp;
   an AC/DC conversion unit for converting an alternating current voltage phase-controlled by a dimmer into a direct current voltage and outputting the converted voltage;
   a DC/AC conversion unit for converting the direct current voltage into a high frequency voltage and driving the discharge lamp so that the discharge lamp performs an intermittent operation including an operation period in which the high frequency voltage is applied to operate the discharge lamp and a non-operation period in which the generation of the high frequency voltage is stopped to turn OFF the discharge lamp; and
   a dimming control unit for outputting to the DC/AC conversion unit a dimming instruction signal for changing a ratio between the operation period and the non-operation period, and
   the dimming control unit detects turn-ON and turn-OFF of the phase-controlled alternating voltage and keeps a difference between a timing of the turn-ON and the start timing of the operation period of the intermittent operation by a DC/AC conversion unit and a difference between the timing of the turn-OFF and the start timing of a non-operation period of the intermittent operation by a DC/AC conversion unit constant.

9. The discharge lamp operating apparatus of claim 8, characterized in that the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit substantially zero.

10. The discharge lamp operating apparatus of claim 8, characterized in that the dimming control unit includes a photocoupler as means for transmitting the dimming instruction signal to the DC/AC conversion unit.

11. The discharge lamp operating apparatus of claim 8, characterized in that the discharge lamp is an electrode-including fluorescent lamp.

12. A discharge lamp operating apparatus characterized in that the discharge lamp operating apparatus includes:
    a discharge lamp;
    an AC/DC conversion unit for converting an alternating current voltage phase-controlled by a dimmer into a direct current voltage and outputting the converted voltage;
    a DC/AC conversion unit for driving the discharge lamp so that the discharge lamp performs an intermittent operation including an operation period in which the direct current voltage is converted into a high frequency voltage with which the discharge lamp is operated and then applied to the discharge lamp and a non-operation period in which the direct current voltage is converted into a high frequency voltage with which the discharge lamp is not operated and then applied to the discharge lamp;
    a dimming control unit for outputting to the DC/AC conversion unit a dimming instruction signal for changing a ratio between the operation period and the non-operation period, and
    the dimming control unit detects turn-ON and turn-OFF of the phase-controlled alternating voltage and keeps a difference between a timing of the turn-ON and a start timing of the operation period of the intermittent operation by the DC/AC conversion unit and a difference between the timing of a turn-OFF and a start timing of the non-operation period of the intermittent operation by the DC/AC conversion unit constant.

13. The discharge lamp operating apparatus of claim 12, characterized in that the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit substantially zero.

14. The discharge lamp operating apparatus of claim 12, characterized in that the dimming control unit includes a photocoupler as means for transmitting the dimming instruction signal to the DC/AC conversion unit.

15. The discharge lamp operating apparatus of claim 12, characterized in that the discharge lamp is an electrode-including fluorescent lamp.

16. A discharge tamp operating apparatus characterized in that the discharge lamp operating apparatus includes:

a discharge lamp;

an AC/DC conversion unit for converting an alternating current voltage phase-controlled by a dimmer into a direct current voltage and outputting the converted voltage;

a DC/AC conversion unit which includes at least one switching element and drives by changing a voltage between gate and source of the switching element, when the direct current voltage is converted into a high frequency voltage and then applied to, the discharge lamp so that the discharge lamp performs an intermittent operation including an operation period in which the discharge lamp is operated and a non-operation period in which a less amount of current is passed in the discharge lamp than that in the operation period to turn OFF the discharge lamp;

a dimming control unit for outputting to the DC/AC conversion unit a dimming instruction signal for changing a ratio between the operation period and the non-operation period, the dimming control unit detects turn-ON and turn-OFF of the phase-controlled alternating voltage and keeps a difference between a timing of the turn-ON and a start timing of the operation period of the intermittent operation by the DC/AC conversion unit and a difference between a timing of the turn-OFF and a start timing of the non-operation period of the intermittent operation by the DC/AC conversion unit constant.

17. The discharge lamp operating apparatus of claim 16, characterized in that the dimming control unit detects turn-ON and turn-OFF of the phase-controlled alternating voltage and keeps a difference between the timing of the turn-ON and the start timing of the operation period of the intermittent operation by the DC/AC conversion unit and a difference between the timing of the turn-OFF and the start timing of the non-operation period of the intermittent operation by the DC/AC conversion unit substantially zero.

18. The discharge lamp operating apparatus of claim 16, characterized in that the dimming control unit includes a photocoupler as means for transmitting the dimming instruction signal to the DC/AC conversion unit.

19. The discharge lamp operating apparatus of claim 16, characterized in that the discharge lamp is an electrode-including fluorescent lamp.

* * * * *

UNITED STATES PATENT AND TRADEMARK OFFICE
CERTIFICATE OF CORRECTION

PATENT NO. : 6,828,740 B2  
DATED : December 7, 2004  
INVENTOR(S) : Kenichiro Takahashi et al.

Page 1 of 1

It is certified that error appears in the above-identified patent and that said Letters Patent is hereby corrected as shown below:

<u>Column 23,</u>
Line 1, "tamp" should be -- lamp --

Signed and Sealed this

Ninth Day of August, 2005

JON W. DUDAS
*Director of the United States Patent and Trademark Office*